US009053672B2

(12) United States Patent
Yasui et al.

(10) Patent No.: US 9,053,672 B2
(45) Date of Patent: Jun. 9, 2015

(54) STEREOSCOPIC IMAGE DISPLAY DEVICE

(71) Applicant: MITSUBISHI ELECTRIC CORPORATION, Tokyo (JP)

(72) Inventors: Hironobu Yasui, Tokyo (JP); Masaaki Hanai, Tokyo (JP); Hideki Yoshii, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 13/872,763

(22) Filed: Apr. 29, 2013

(65) Prior Publication Data
US 2013/0314457 A1 Nov. 28, 2013

(30) Foreign Application Priority Data

May 25, 2012 (JP) .................................. 2012-119213

(51) Int. Cl.
H04N 13/04 (2006.01)
G09G 3/36 (2006.01)
G09G 5/00 (2006.01)
G09G 5/02 (2006.01)
G09G 3/00 (2006.01)

(52) U.S. Cl.
CPC ................... *G09G 3/36* (2013.01); *G09G 3/003* (2013.01); *G09G 2310/0202* (2013.01); *G09G 2320/0209* (2013.01); *G09G 2360/145* (2013.01); *H04N 13/0438* (2013.01)

(58) Field of Classification Search
USPC ............... 345/156–173, 690–691; 348/42–60
See application file for complete search history.

(56) References Cited

U.S. PATENT DOCUMENTS

| 2004/0095402 A1* | 5/2004 | Nakano ......................... 346/102 |
| 2006/0209407 A1 | 9/2006 | Hamagishi |
| 2007/0097260 A1 | 5/2007 | Takeuchi et al. |
| 2008/0112164 A1 | 5/2008 | Teshirogi |
| 2009/0085896 A1 | 4/2009 | Nagase et al. |
| 2011/0292040 A1 | 12/2011 | Chiba |

(Continued)

FOREIGN PATENT DOCUMENTS

| CN | 101178874 A | 5/2008 |
| CN | 102184711 A | 9/2011 |
| CN | 102263971 A | 11/2011 |

(Continued)

OTHER PUBLICATIONS

Taiwanese Office Action issued on Dec. 11, 2014 and partial English translation of the Search Report.

*Primary Examiner* — Grant Sitta
(74) *Attorney, Agent, or Firm* — Birch, Stewart, Kolasch & Birch, LLP

(57) ABSTRACT

A light source portion includes a plurality of back lights provided corresponding to respective regions obtained by virtually dividing a liquid crystal panel screen into a plurality of parts, the back lights have a light emission intensity controlled based on a light emission intensity value and have ON and OFF operations controlled in response to a light emission driving signal, and the light emission driving signal is constituted to sequentially turn ON the plurality of back lights synchronously with a stereoscopic image signal and to turn ON the plurality of back lights at the same time in a predetermined timing, and is constituted to individually control a light emission period for the plurality of back lights based on image information about the stereoscopic image signal.

11 Claims, 11 Drawing Sheets

(56) References Cited

U.S. PATENT DOCUMENTS

2012/0105605 A1 5/2012 Nam et al.
2012/0113159 A1 5/2012 Chiba et al.

FOREIGN PATENT DOCUMENTS

| | | |
|---|---|---|
| CN | 102457747 A | 5/2012 |
| CN | 102469327 A | 5/2012 |
| JP | 11-295689 A | 10/1999 |
| JP | 2010-276928 A | 12/2010 |
| JP | 2011-141324 A | 7/2011 |
| JP | 2011141324 A * | 7/2011 |
| TW | I281554 A | 5/2007 |
| TW | I349255 A | 9/2011 |
| TW | I354264 A | 12/2011 |

* cited by examiner

F I G . 1
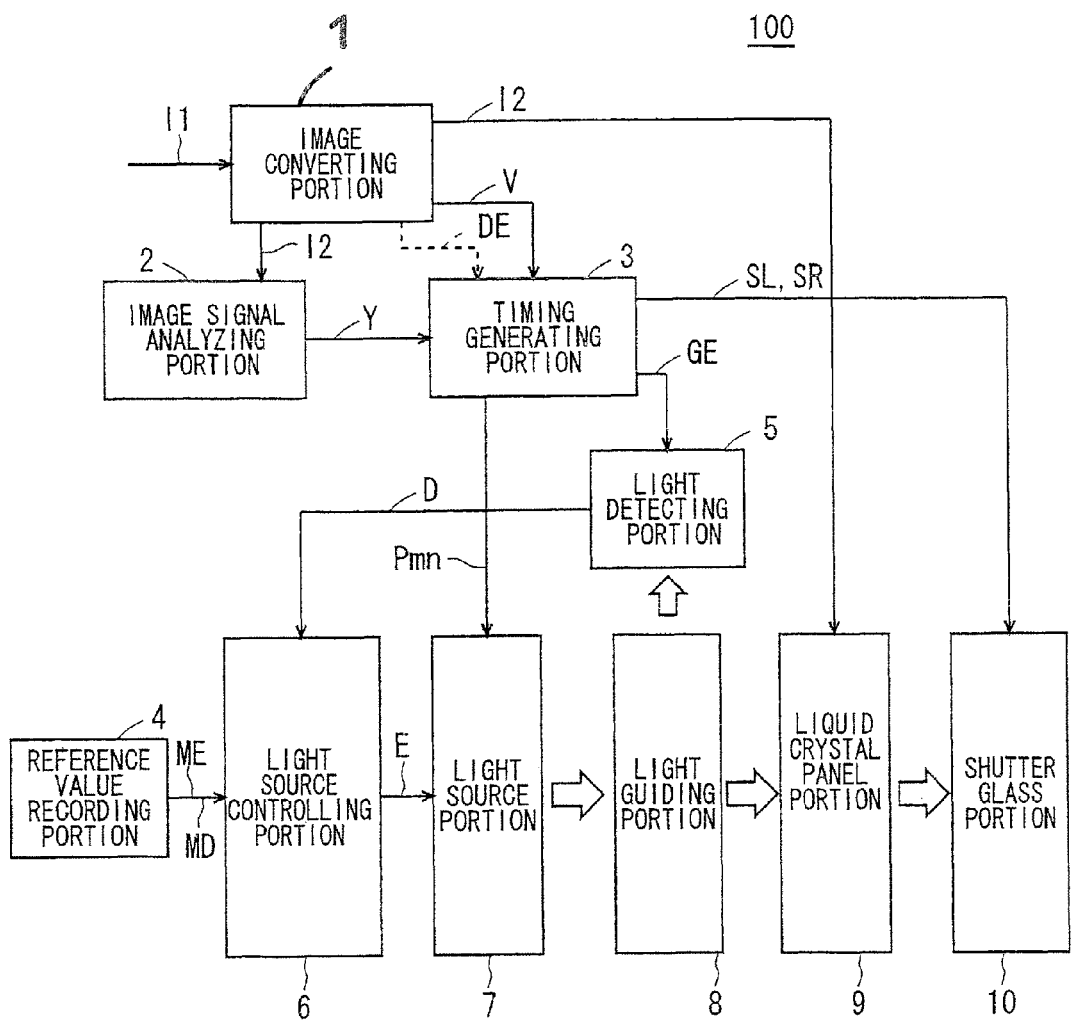

F I G . 2
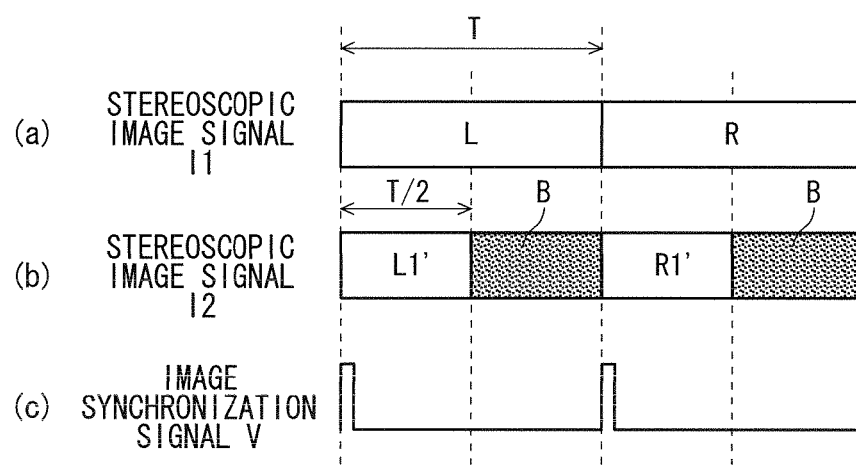

FIG. 5
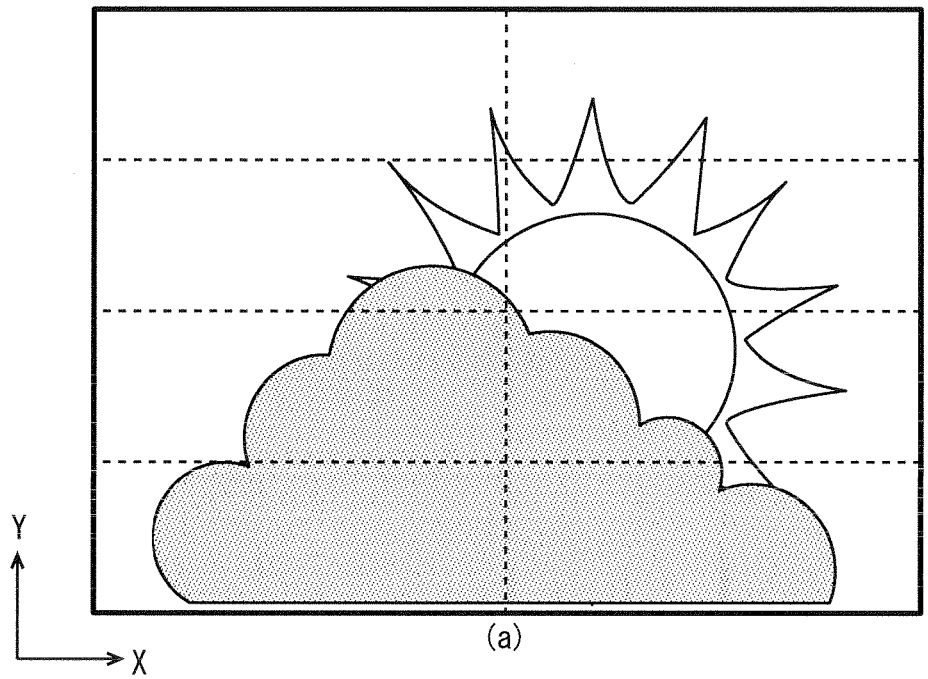
(a)
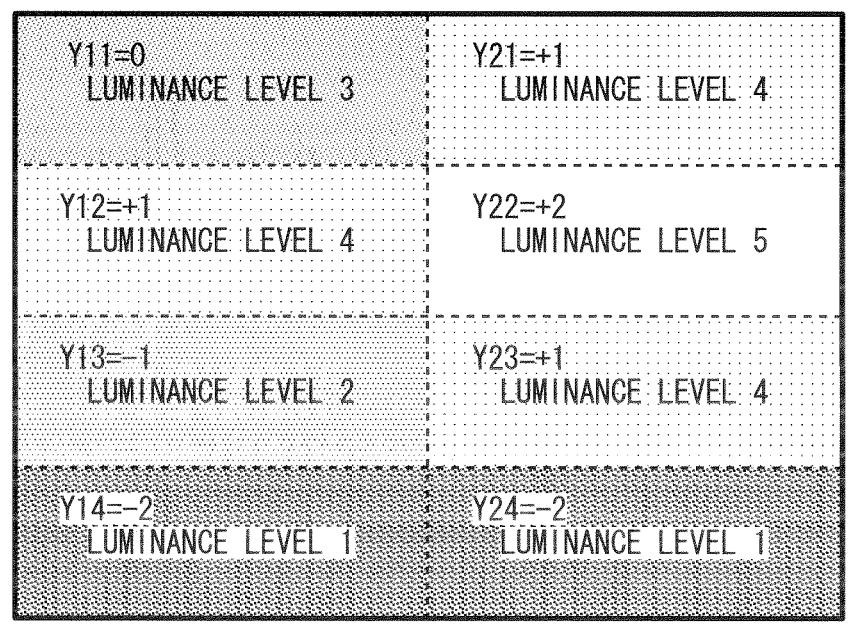
(b)

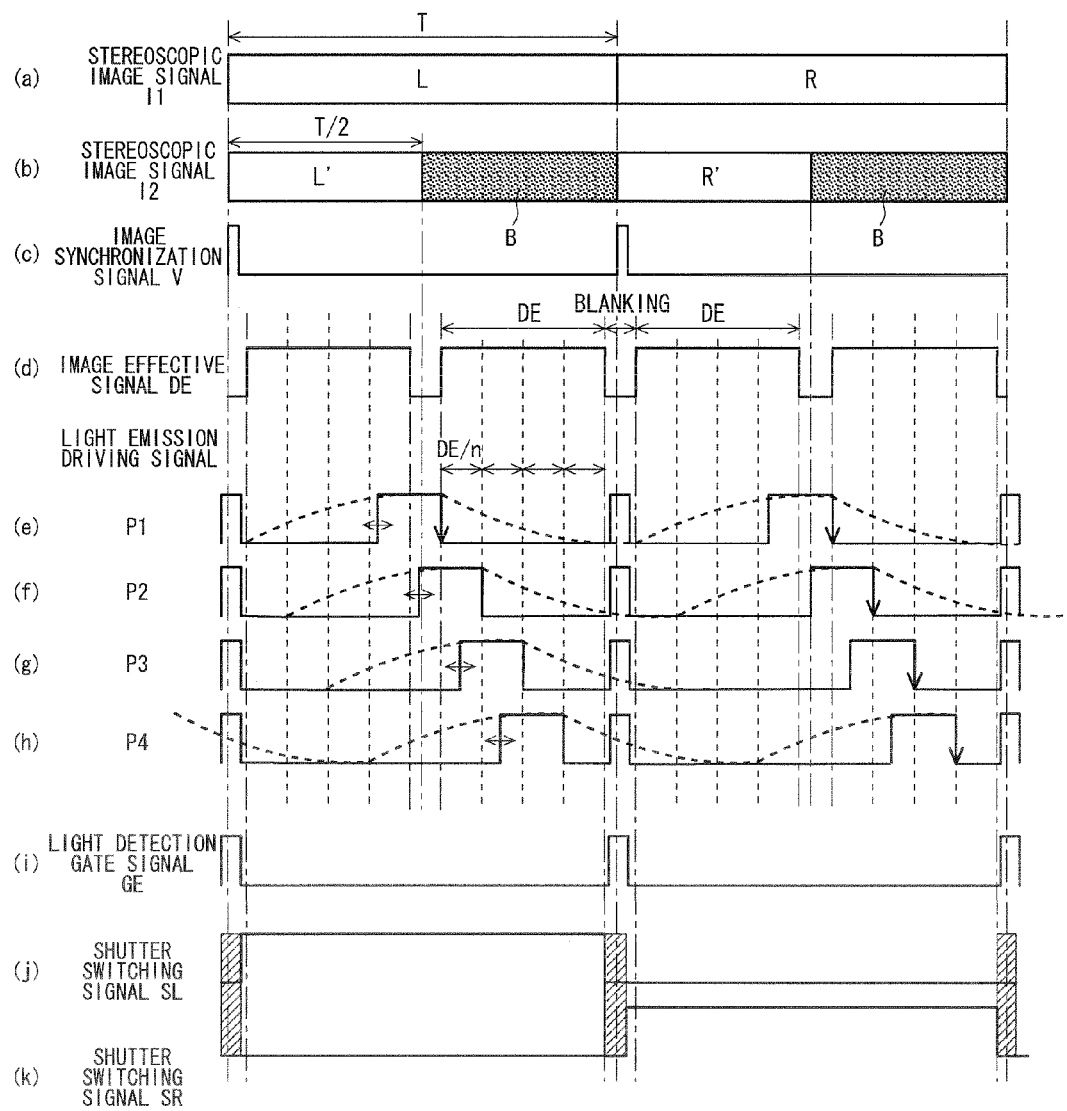

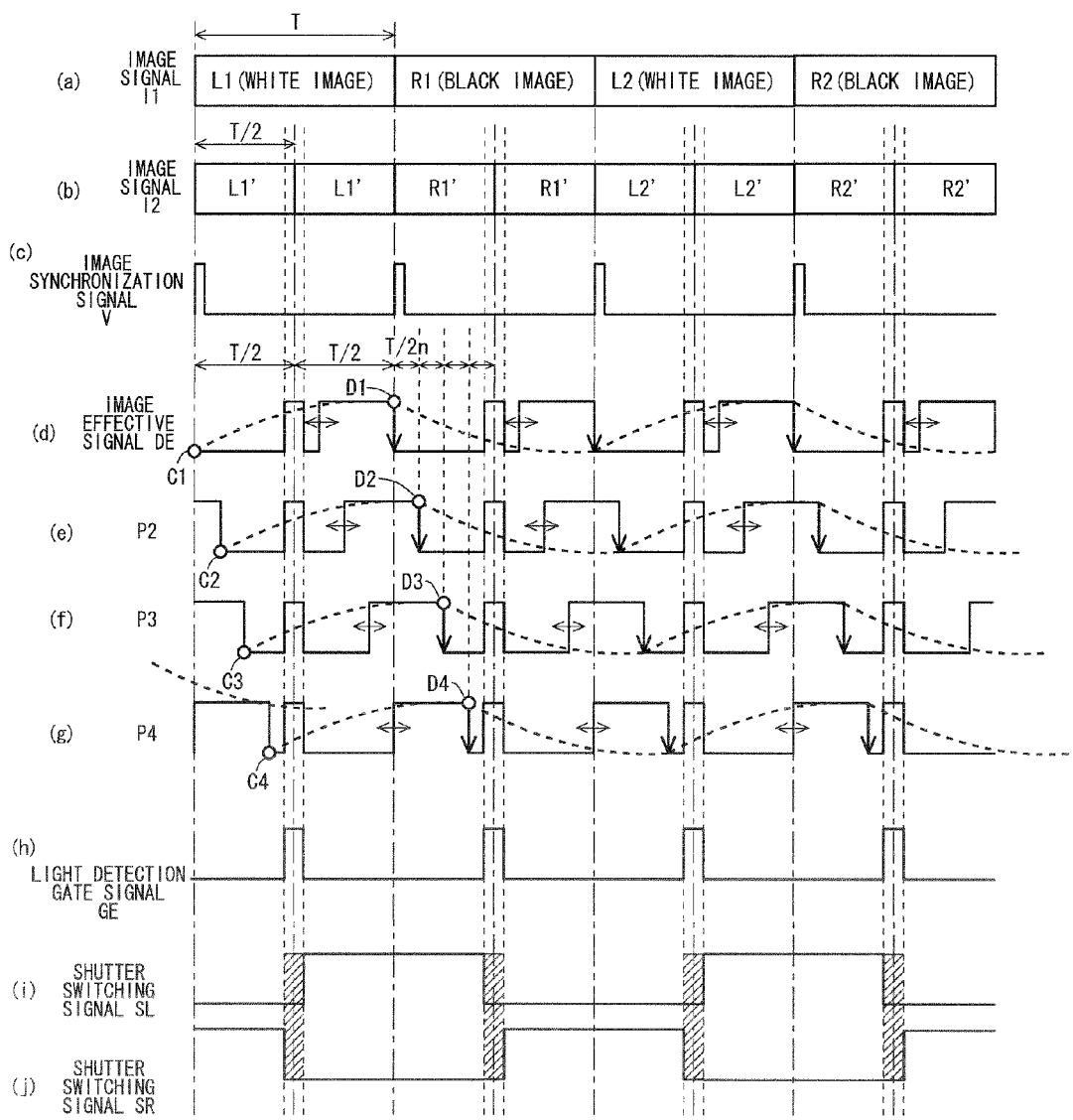

STEREOSCOPIC IMAGE DISPLAY DEVICE

BACKGROUND OF THE INVENTION

1. Field of the Invention

The present invention relates to a stereoscopic image display device, and more particularly to a stereoscopic image display device for seeing an image for a right eye and an image for a left eye which are displayed on a liquid crystal panel in time sharing through shutter glasses, thereby giving a solidity to the images artificially.

2. Description of the Background Art

In recent years, a stereoscopic image display device technique utilizing a binocular parallax is developed as an image display technique for artificially obtaining a solidity by a user. This is a method of seeing a display by using shutter glasses for alternately switching the image for the left eye and the image for the right eye on a time basis to display the images onto a display and closing left and right fields of view synchronously with an image switching timing, thereby separating the image for the right eye and the image for the left eye temporally and causing the user's left and right eyes to see the image for the left eye and the image for the right eye and thus giving a solidity to the images artificially.

The stereoscopic image display device has the following problem. In other words, there is an occurrence of a three-dimensional (3D) crosstalk in which an image for a left eye that is not originally incident on a right eye of an observer is incident thereon or an image for the right eye that is not originally incident on the left eye is incident thereon.

Moreover, there is a problem in that a light source to be used in a back light for emitting light at a back face of a liquid crystal panel has a luminance or a white color changed due to a variation in a temperature or aged deterioration.

As a countermeasure to be taken against these problems, there is disclosed the following technique in the liquid crystal display described in Japanese Patent Application Laid-Open No. 11-295689 (1999) (Page 3, FIG. 1). More specifically, by three types of back lights having different luminescent colors and light sensors corresponding to the luminescent colors, the luminescent colors are always caused to be equal to set values against a variation in a temperature or aged deterioration of the back lights.

In the stereoscopic image display device described in Japanese Patent Application Laid-Open No. 2010-276928 (Pages 6 to 7, FIG. 2), moreover, there is disclosed the technique for scanning a divided back light synchronously with an image to carry out lighting for a short period sequentially (back light scanning), thereby suppressing a 3D crosstalk.

Furthermore, in the image display device described in Japanese Patent Application Laid-Open No. 2011-141324 (Pages 9 to 11, FIGS. 11 and 12), the following technique is disclosed. More specifically, a 3D crosstalk is suppressed by dividing back lights to emit light for a light emission period for each of the back lights depending on a brightness of an input image signal, that is, by changing a luminance to enhance a contrast and synchronizing a light emission timing of the back light with rewrite of a liquid crystal to vary a phase, thereby emitting light sequentially for a short period.

In the case in which the back light sources having different luminescent colors are used as described in the Japanese Patent Application Laid-Open No. 11-295689 and the back light sources are divided and the light emission period of the back light is changed depending on the brightness of the input image, and the control for sequentially carrying out the scanning and the light emission is performed synchronously with the image as described in the Japanese Patent Application Laid-Open No. 2010-276928 and the Japanese Patent Application Laid-Open No. 2011-141324, there is a possibility that the light sensor might be influenced by the light quantity of the adjacent back light so that the output value of the light sensor might not constant and the luminescent color of the light source cannot be equal to the set value as a result because the back lights are divided.

SUMMARY OF THE INVENTION

It is an object of the present invention to provide a stereoscopic image display device capable of causing a luminescent color of a light source to be equal to a set value and suppressing a 3D crosstalk against a variation in a temperature or aged deterioration of a plurality of back lights also in the case in which a light source constituted by the back lights is used.

An aspect of the present invention is directed to a stereoscopic image display device including a liquid crystal panel portion to be horizontally scanned sequentially from an upper part to a lower part of a liquid crystal panel screen based on a stereoscopic image signal, thereby varying a transmittance of light depending on a gray scale of the stereoscopic image signal, a light guiding portion provided on a back face side of the liquid crystal panel portion for receiving light from a light source portion and diffusing the light to form a uniform surface light source, a light detecting portion for detecting a light intensity of light emitted from the light guiding portion, and a light source controlling portion for controlling a light emission intensity value of the light source portion in such a manner that a light detection value of the light detecting portion is equal to a preset reference light detection value, wherein the light source portion includes a plurality of back lights provided corresponding to respective regions obtained by virtually dividing the liquid crystal panel screen into a plurality of parts, the plurality of back lights have a light emission intensity controlled based on the light emission intensity value and have ON and OFF operations controlled in response to a light emission driving signal, the light emission driving signal is constituted to sequentially turn ON plurality of the back lights synchronously with the stereoscopic image signal and to turn ON the plurality of back lights at the same time in a predetermined timing, and is constituted to individually control a light emission period for the plurality of back lights based on image information about the stereoscopic image signal, and the light detecting portion is controlled to carry out a detecting operation in such timing as to turn ON the plurality of back lights at the same time based on a light detection gate signal.

According to the stereoscopic image display device, the enhancement in a contrast and the suppression in a 3D crosstalk are caused to be compatible with each other and stable light detection is carried out. Consequently, it is possible to obtain an effect that a brightness or a color of the back light can be prevented from being changed due to a variation in a temperature of the back light or a passage of a time. Moreover, the light detection is carried out when the back lights are turned ON at the same time. Therefore, it is possible to obtain an effect that the same light detection value can be detected to increase the degree of freedom of disposition irrespective of a place between the light guiding portion and the liquid crystal panel portion where the light detecting portion is to be disposed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a structure of a stereoscopic image display device according to a first preferred embodiment of the present invention;

FIG. 2 is a diagram for explaining an operation in an image converting portion;

FIG. 5 is a diagram for explaining an operation in an image analyzing portion;

FIG. 11 is a timing chart showing a light emission driving signal based on an image effective signal according to a second preferred embodiment of the present invention; and FIG. 12 is a timing chart showing a light emission driving signal according to a third preferred embodiment of the present invention.

DESCRIPTION OF THE PREFERRED EMBODIMENTS

First Preferred Embodiment

<Structure of Device>

Figure 3:
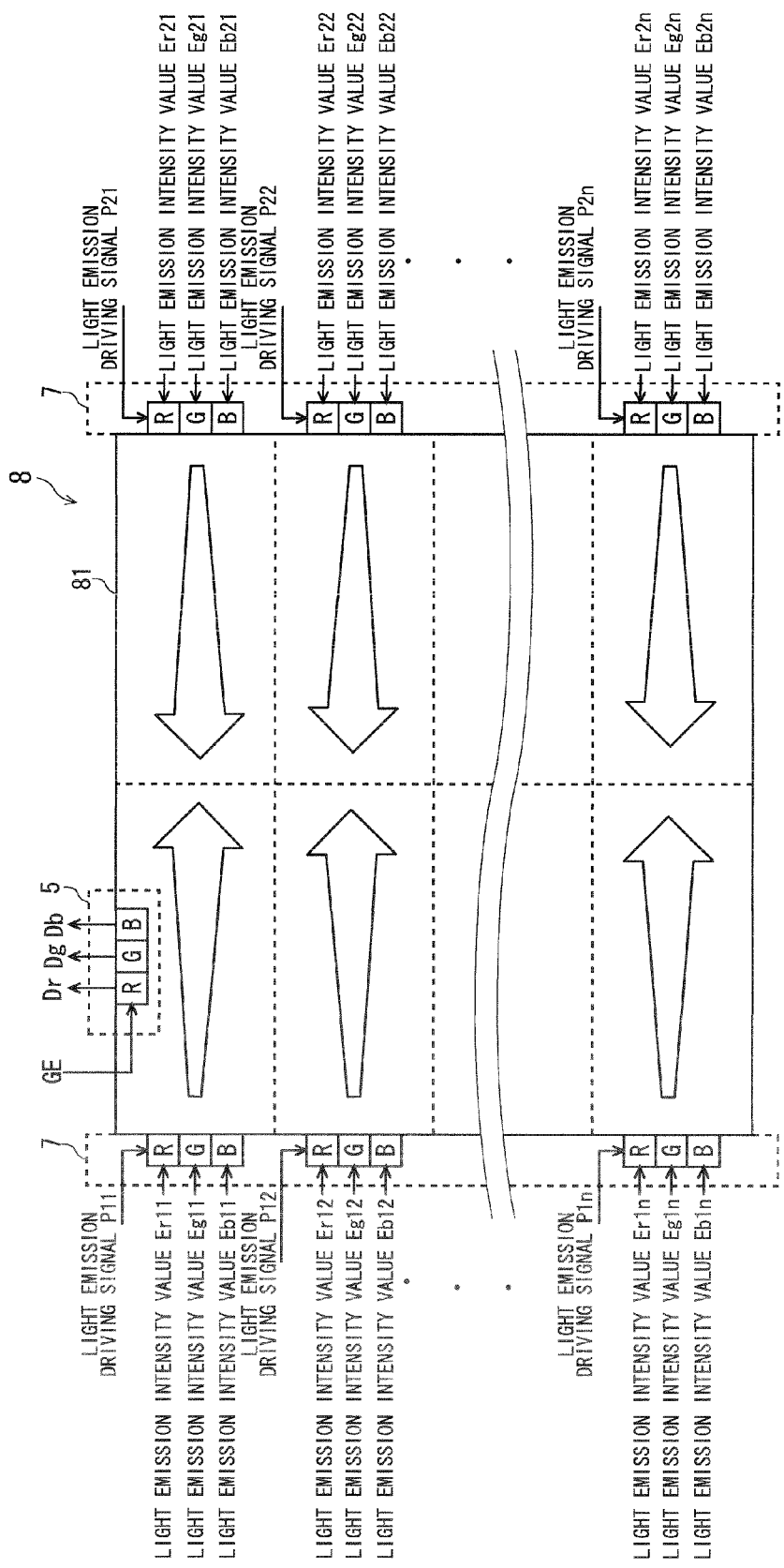
FIG. 3 is a diagram for explaining structures of a light guiding portion, a light source portion and a light detecting portion which are provided on a back face of a liquid crystal panel portion.

FIG. 1 is a block diagram showing a structure of a stereoscopic image display device 100 according to the present invention. As shown in FIG. 1, the stereoscopic image display device 100 includes an image converting portion 1, an image signal analyzing portion 2, a timing generating portion 3, a reference value recording portion 4, a light detecting portion 5, a light source controlling portion 6, a light source portion 7, a light guiding portion 8, a liquid crystal panel portion 9 and a shutter glass portion 10. Light emitted from the light source portion 7 is incident on the shutter glass portion 10 through the light guiding portion 8 and the liquid crystal panel portion 9, and furthermore, is also incident on the light detecting portion 5 through the light guiding portion 8.

The image converting portion 1 receives a stereoscopic image signal I1 and then converts the stereoscopic image signal I1 into a stereoscopic image signal I2 and outputs the stereoscopic image signal I2, and furthermore, outputs an image synchronization signal V to the timing generating portion 3.

The stereoscopic image signal I2 is sent to the image signal analyzing portion 2 and the liquid crystal panel portion, and the image signal analyzing portion 2 obtains luminance information about the stereoscopic image signal I2 and outputs image luminance information Y to the timing generating portion 3.

The image synchronization signal V is sent to the timing generating portion 3, and the timing generating portion 3 determines and outputs a light emission driving signal Pmn for the light source portion 7 and a light detection gate signal GE based on the image synchronization signal V and the image luminance information Y output from the image signal analyzing portion 2. Moreover, the timing generating portion 3 outputs shutter switching signals SL and SR to the shutter glass portion 10.

The light detection gate signal GE is sent to the light detecting portion 5, and the light detecting portion 5 carries out light detection for a period of High of the light detection gate signal GE and outputs a light detection value D to the light source controlling portion 6.

The light emission driving signal Pmn is sent to the light source portion 7 to cause the light source portion 7 to emit light for a period of High of the light emission driving signal Pmn.

The reference value recording portion 4 records and holds a reference light detection value MD and a reference light emission intensity value ME which are predetermined by a user, and the light source controlling portion 6 determines a light emission intensity value E in such a manner that the reference light detection value MD sent from the reference value recording portion 4 is equal to the light detection value D output from the light detecting portion 5, and outputs the light emission intensity value E to the light source portion 7. Herein, an outline arrow in FIG. 1 indicates light.

The light source portion 7 includes a plurality of back lights provided corresponding to respective regions which are obtained by virtually dividing a liquid crystal panel screen (a division into m parts in a horizontal direction and a division into n parts in a vertical direction), and the back lights are constituted by a light source having at least one color. The light source is constituted by a light source for pulse light emission to be carried out with the light emission intensity value E output from the light source controlling portion 6 for a period of High of the light emission driving signal Pmn output from the timing generating portion 3, and the light emission intensity is variably constituted by the light emission intensity value E.

The light emission driving signal Pmn is sent to each of m by n back lights, and the back light is turned ON to emit light for the period of High of the light emission driving signal Pmn and is turned OFF for a period of Low.

The light source of the back light may be a single light source having a white color or a light source having the white color obtained by light mixing in a combination of light sources having many colors, for example, a combination of light sources having three colors of red (R), green (G) and blue (B) or a combination of light sources having two colors of cyan (C) and red (R).

An emitter of the light source may be of any type or may be constituted by a light emitting diode (LED), a laser diode, an organic electroluminescence (organic EL) device or the like, or their combination, for example.

In the case in which the light source of the back light is constituted by a combination of light sources having many colors, the light emission intensity value E may be given to each of combinations of the number of the m by n back lights and the number of the colors of the light source or may be given to only each of the light sources.

The light source portion 7 may be disposed directly under the back face of the liquid crystal panel or on left and right ends and upper and lower ends of the liquid crystal panel. The light guiding portion 8 is disposed on the back face side of the liquid crystal panel. The light guiding portion 8 includes a light guide plate which is provided for uniformly diffusing light output from the light source portion 7 over a surface into a predetermine region to form a surface light source. The light source portion 7 includes a plurality of back lights which is to be disposed directly under the light guide plate or on the left and right ends or the upper and lower ends.

The light guide plate also has a function for carrying out light mixing over light sources having many colors to obtain a white color in the case in which the light sources of the back lights are constituted by the combination of the light sources having many colors. Also in the case in which the light source portion 7 is constituted by the m by n back lights, it is possible to diffuse light by means of the light guide plate.

The liquid crystal panel portion 9 is constituted by a liquid crystal panel of a transmission type, for example, and has a structure in which a color filter is arranged over a panel surface and scanning is sequentially carried out from an upper end side to a lower end side synchronously with the stereoscopic image signal I2 output from the image converting portion 1, and a transmittance of light from a back face is varied every pixel to display an image depending on a gray scale of the stereoscopic image signal I2.

The shutter glass portion 10 has such a structure as to switch transmission or non-transmission of shutters for left and right eyes depending on the shutter switching signals SL and SR output from the timing generating portion 3. Herein, the shutter switching signal for the left eye is represented by SL and the shutter switching signal for the right eye is represented by SR.

The shutter switching signal is a binary signal, and the shutter is opened and an image of the liquid crystal panel portion 9 is transparently visible for the period of High and the shutter is closed to set the image of the liquid crystal panel portion 9 into the non-transmission for the period of Low. By viewing the image displayed on the liquid crystal panel portion 9 through the shutter glasses to see only a left eye image for the left eye and only a right eye image for the right eye, it is possible to artificially see a stereoscopic image.

It is also possible to use any shutter for switching an image into the transmission or non-transmission. For example, it is also possible to employ a structure obtained by a combination of a polarizing plate and a liquid crystal for switching a polarizing direction, a structure in which the transmission is set at a polarizing angle in the same direction and the non-transmission is set at a polarizing angle in a closing direction, or a structure in which the left and right eyes are physically closed alternately. Moreover, any method may be used for a method of transmitting the shutter switching signal. For example, it is possible to use a transmitting method utilizing infrared rays, a radio wave or a wire.

<Schematic Operation>

Next, a schematic operation of the stereoscopic image display device 100 described above will be explained by using FIG. 2 with reference to FIG. 1.

It is assumed that the stereoscopic image signal I1 input to the stereoscopic image display device 100 is an image signal in which left and right eye images captured on two visual points are given in time sharing and are arranged to make a pair of a left eye image L and a right eye image R as shown in part (a) of FIG. 2. A single image frame time for the left eye image L or the right eye image R is represented by T.

The image converting portion 1 converts the stereoscopic image signal I1 into a double frame frequency, and a single black image B is inserted between a left eye image L' and a right eye image R' to create the stereoscopic image signal I2 as shown in part (b) of FIG. 2. By inserting the black image B, it is possible to separate the left eye image and the right eye image from each other.

For this reason, a single image frame time for the left eye image L' or the right eye image R' of the stereoscopic image signal I2 is represented by T/2. Moreover, the image synchronization signal V for defining pieces of head timing of the left eye image L' and the right eye image R' is output to be synchronized with the stereoscopic image signal I2 as shown in part (c) of FIG. 2. Herein, the image synchronization signal V has a rise timing set to be a reference for synchronization. For this reason, a pulse width is not particularly restricted.

The image signal analyzing portion 2 obtains luminance information about the stereoscopic image signal I2 and outputs the image luminance information Y. The light source portion 7 includes back lights provided corresponding to the respective regions obtained by dividing the liquid crystal panel screen into m parts in the horizontal direction and n parts in the vertical direction, and the image luminance information Y is obtained corresponding to each of the liquid crystal panel screens thus divided. Consequently, m by n luminance information is acquired for a single image frame. This is represented by image luminance information Ymn.

The timing generating portion 3 determines the light emission driving signal Pmn and the light detection gate signal GE of the m by n back lights (not shown) included in the light source portion 7 based on the image synchronization signal V output from the image converting portion 1 and the image luminance information Ymn output from the image signal analyzing portion 2, and outputs them.

In other words, timing for the light emission driving signal Pmn is determined in a synchronous timing with image scanning based on the image synchronization signal V, and a light emission period (luminance) for the light emission driving signal Pmn to be sent to the m by n back lights included in the light source portion 7 is determined based on the image luminance information Ymn corresponding to a partial luminance of an image.

Moreover, a pulse signal for instantaneously turning ON all of the m by n back lights included in the light source portion 7 is also added in such a manner that light detection can be carried out with high precision. The light gate signal GE is determined to be adapted to the full lighting timing. Herein, the light emission driving signal Pmn is output to the m by n back lights respectively. Moreover, the light detection gate signal GE may be output corresponding to the number of the light sensors in the light detecting portion 5 or may be constituted to divide a single signal corresponding to the number of the light sensors and to send the signals thus obtained.

The reference value recording portion 4 records and holds the reference light detection value MD corresponding to the number of combinations of the number of the light sensors in the light detecting portion 5 which are provided and the number of sensor colors, and furthermore, records and holds the reference light emission intensity value ME corresponding to the number of combinations of the number of the m by n back lights in the light source portion 7 and the number of luminescent colors.

A technique for determining the reference light emission intensity value ME inputs a reference signal, for example, a full white signal to operate the stereoscopic display device 100, and measures liquid crystal panel output light or shutter glass output light (any of the liquid crystal panel output light which is transmitted through the shutter glasses) by means of a luminance meter provided on an outside or the like.

The reference light emission intensity value ME is regulated corresponding to the number of colors in each of the m by n back lights in such a manner that the output light has an intended luminance, white balance, color temperature or the like.

Moreover, the light emission intensity value of each of the m by n back lights is regulated in such a manner that the luminance of the screen or color shading becomes uniform. Thus, the light detection values of the respective light sensors and the light emission intensity values to be input to the respective back lights are recorded and held as the reference light detection value MD and the reference light emission intensity value ME in the case in which the output light of the liquid crystal panel and the output light of the shutter glasses are regulated to have intended values.

The back light has a brightness changed depending on a variation in a temperature or an elapsed time. Therefore, the reference light detection value MD and the reference light emission intensity value ME are recorded and held in the reference value recording portion 4 every condition of the temperature of the back light or the elapsed time, respectively.

For example, it is possible to produce an effect for performing early convergence to an intended color by determining the respective reference light emission intensity values ME in the cases in which the temperature of the back light is low and high.

For instance, when several years pass, the back light is darkened. For this reason, an original brightness may be held by increase in power with the reference light detection value MD maintained to be equal or the reference light detection value MD may be decreased to maintain the power to be constant and to gradually reduce a target brightness when a time passes.

Moreover, a final light emission intensity value in extinction of the back light may be recorded and held to be an initial value in next lighting. By employing the structure, it is possible to produce an effect for performing the early convergence to an intended color.

In addition, it is also possible to employ a structure in which each of the reference light detection value MD and the reference light emission intensity value ME may be recorded and held every white color of target output light or color temperature. By employing the structure, it is possible to produce an effect capable of switching setting of the color temperature or the like by means of the back light.

The light detecting portion 5 includes at least one light sensor capable of detecting a light intensity of at least one color, and carries out light detection for the period of High of the light detection gate signal GE output from the timing generating portion 3 and outputs the light detection value D. The light detection value D is output as a voltage value which is proportional to a light emission intensity of a detection target, for example.

The light sensor of the light detecting portion 5 may be a single luminance sensor for detecting a luminance value or a color sensor for detecting three colors of red (R), green (G) and blue (B) respectively. Any type of the sensor may be used, for example, it is also possible to employ a structure in which a photocell, a photodiode or their combination with a light filter. In the case in which a multi-color light sensor is used, the light detection value D is output corresponding to the number of colors.

Moreover, it is sufficient that the light sensor of the light detecting portion 5 is provided in an optional place between the light guiding portion 8 and the liquid crystal panel portion 9, and the light sensor may be provided in a single place or a plurality of places. In the case in which a plurality of light sensors is provided, the light detection value D is output corresponding to the number of the light sensors.

The light source controlling portion 6 outputs the reference light emission intensity value ME recorded in the reference value recording portion 4 to the light source portion 7 at a first time immediately after starting, and determines and outputs the light emission intensity value E in such a manner that the light detection value D output from the light detecting portion 5 is equal to the reference light detection value MD at a second time and thereafter.

Herein, the light emission intensity value E is defined by a current quantity and is input to the light source portion 7 to obtain such a value as to increase the light quantity in proportion to the light emission intensity value E, for example.

The light source controlling portion 6 increases and outputs the light emission intensity value E if the light detection value D is smaller than the reference light detection value MD, and to the contrary, reduces and outputs the light emission intensity value E if the light detection value D is greater than the reference light detection value MD. By controlling the light detection value D to be equal to the reference light detection value MD, thus, it is possible to cause output light to have an intended value. The light emission intensity value E output from the light source controlling portion 6 is output corresponding to each of the back lights.

With reference to FIG. 3, next, description will be given to an example of the disposition of the light source portion 7 and the light detecting portion 5 in the case in which the light guiding portion 8 is provided on the back face of the liquid crystal panel portion 9.

FIG. 3 shows a light guide plate 81 of the light guiding portion 8 which is to be disposed on the back face of the liquid crystal panel portion 9 and does not show the liquid crystal panel portion 9.

Moreover, although FIG. 3 shows an example in which the light detecting portion 5 is disposed on an upper end of the light guide plate 81, a place for the disposition is optional between the light guiding portion 8 and the liquid crystal panel portion 9.

Light emitted from the light source portion 7 is subjected to surface diffusion by means of the light guide plate 81 and is guided to a central part of the light guide plate 81 as shown in an arrow of FIG. 3. The light detecting portion 5 detects the diffused light.

In the example of FIG. 3, the light source portion 7 is disposed on a left side end face and a right side end face in the light guide plate 81, and two (m=2) back lights in the horizontal direction and n back lights in the vertical direction are constituted to include light sources having three colors of R, G and B which can be independently controlled, respectively.

By employing the structure, the light guide plate 81 is divided into two portions in the horizontal direction (an X direction) and n portions in the vertical direction (a Y direction) as shown in a broken line of FIG. 3.

The light guide plate 81 has a function for carrying out the diffusion so as not to make unevenness over a very wide surface. For this reason, a range shown in the broken line of FIG. 3 does not only shine but all light emitted from an adjacent light source or a very distant light source is superimposed so that the whole light guide plate 81 shines to give a sufficient light quantity for the liquid crystal panel portion 9 which is opposed.

In FIG. 3, a light emission driving signal to be sent to a first back light in an uppermost part at a left side toward the drawing is represented as a light emission driving signal P11, a light emission driving signal to be sent to a second back light provided thereunder is represented as a light emission driving signal P12, and a light emission driving signal to be sent to an n-th back light in a lowermost part is represented as a light emission driving signal P1*n*. Similarly, a light emission driving signal to be sent to a first back light in an uppermost part at a right side toward the drawing is represented as a light emission driving signal P21, a light emission driving signal to be sent to a second back light provided thereunder is represented as a light emission driving signal P22, and a light emission driving signal to be sent to an n-th back light in a lowermost part is represented as a light emission driving signal P2*n*.

Light emission intensity values Er11, Eg11 and Eb11 are given to light sources having three colors of R, G and B constituting the first back light at the left side toward the drawing respectively, light emission intensity values Er12, Eg12 and Eb12 are given to light sources having three colors of R, G and B constituting the second back light respectively, and light emission intensity values Er1*n*, Eg1*n* and Eb1*n* are given to light sources having three colors of R, G and B constituting the n-th back light respectively. Similarly, light emission intensity values Er21, Eg21 and Eb21 are given to light sources having three colors of R, G and B constituting the first back light at the right side toward the drawing respectively, light emission intensity values Er22, Eg22 and Eb22 are given to light sources having three colors of R, G and B constituting the second back light respectively, and light emission intensity values Er2*n*, Eg2*n* and Eb2*n* are given to light sources having three colors of R, G and B constituting the n-th back light respectively.

Moreover, in the example, the light detecting portion 5 in FIG. 3 is constituted by a color sensor for detecting each of the three colors of R, G and B, and the light detection gate signal GE is sent to the light detecting portion 5 and light detection values Dr, Dg and Db are output from the color sensor having the three colors respectively <Detailed Operation>

Next, the detailed operation of the stereoscopic image display device 100 will be described by using FIGS. 4 to 10 with reference to FIG. 1.

Figure 4:
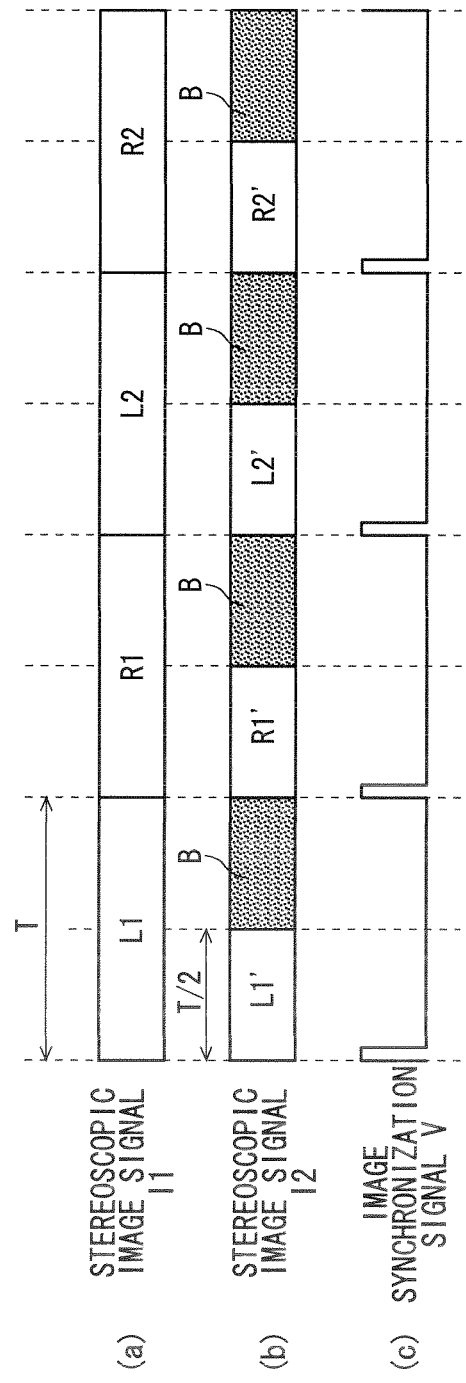
FIG. 4 is a diagram for explaining the operation in the image converting portion.

It is assumed that the stereoscopic image signal I1 to be input to the stereoscopic image display device 100 is arranged in such a manner that left and right eye images captured on two visual points are given in time sharing to make a pair of a left eye image L1 and a right eye image R1 as shown in part (a) of FIG. 4, for example. A single image frame time for the left eye image or the right eye image is represented by T.

The image converting portion 1 converts the stereoscopic image signal I1 into a double frame frequency and a single black image B is inserted between a left eye image L1' and a right eye image R1' to create the stereoscopic image signal I2 as shown in part (b) of FIG. 4, for instance. In the case in which the image signal I1 is input as L1, R1 for the frame period T of a single image as shown in the part (a) of FIG. 4, therefore, the stereoscopic image signal I2 output from the image converting portion 1 is obtained as L1', B, R1', B for a frame period T/2 of the single image.

Although the image signal analyzing portion 2 requires luminance information about the stereoscopic image signal I2 and outputs image luminance information Ymn, it demands luminance information about a left eye image and a right eye image without considering the black image inserted by the image converting portion 1.

An example of an operation to be carried out in the image signal analyzing portion 2 will be described. First of all, a whole average luminance HYa is found for a single image of the stereoscopic image signal I2. The average luminance HYa can be obtained in accordance with the following Equation (1), wherein a gray scale value of the luminance signal Y included in the stereoscopic image signal I2 is represented by Yi and the number of pixels corresponding to one frame is represented by Fa.

[Equation 1]

$$HYa = \sum_{i=1}^{Fa} Yi/Fa \qquad (1)$$

Next, there is found an average luminance HYmn of an input image corresponding to respective regions obtained by dividing the liquid crystal panel screen into m and n parts in the horizontal and vertical directions respectively.

For example, in the case in which the liquid crystal panel screen is divided into two parts in the horizontal direction and four parts in the vertical direction, there is found an average luminance of an input image (a divided image) obtained by a division into half and quarter regions in the horizontal and vertical directions respectively. Then, the average luminance HYmn of the divided image is compared with the average luminance HYa of the whole image. A process for increasing the luminance of the back light is carried out if the average luminance of the divided image is higher than that of the whole image, and a process for decreasing the luminance of the back light is carried out if the average luminance of the divided image is lower than that of the whole image.

Herein, the image luminance information Ymn can be expressed in the following Equation (2).

[Equation 2]

$$Ymn = g \times (HYmn - HYa) \qquad (2)$$

A coefficient "g" indicates a gain which is increased in the case in which the back light control is to be positively carried out to emphasize contrast feeling. Moreover, the gain is regulated to be decreased in the case in which the luminance of the back light is excessively reduced so that a gray scale cannot be seen or the case in which the light and shade is excessively acquired.

For example, a unit of the image luminance information Ymn may be expressed in 0 to 100% as a ratio to the average luminance value, an 8-bit gray scale (0 to 255 gray scales) or a luminance level standardized with a predetermined value.

FIG. 5 is a diagram for explaining the operation of the image signal analyzing portion 2 by using a specific example of an image. FIG. 5 shows an example in which two by four light source portions 7 are disposed to divide the liquid crystal panel screen into two parts in the horizontal direction (X direction) and four parts in the vertical direction (Y direction), and a broken line in the drawing indicates each region of the liquid crystal panel screen which is divided by the two by four back lights.

Part (a) of FIG. 5 shows an image having bright sun and dark cloud in the sky, and part (b) of FIG. 5 shows an average luminance of an image corresponding to the divided regions with a luminance level set into five stages for convenience. The luminance level is set to have a higher average luminance with increase in a numeric value.

In the part (b) of FIG. 5, image luminance information in a region of an uppermost part at a left side toward the drawing is represented as Y11, image luminance information in a region provided thereunder is represented as Y12, image luminance information in a subsequent region is represented as Y13, and image luminance information in a region of a lowermost part is represented as Y14. Moreover, image luminance information in a region of an uppermost part at a right side toward the drawing is represented as Y21, image luminance information in a region provided thereunder is represented as Y22, image luminance information in a subsequent region is represented as Y23, and image luminance information in a region of a lowermost part is represented as Y24.

If the average luminance HYa of the whole image has the luminance level of 3, the image luminance information Y11 becomes equal to zero because of the same whole average luminance, and the image luminance information Y22 has the luminance level of 5 because it corresponds to the sun portion, and becomes equal to +2. Furthermore, the image luminance information Y14 is output to be equal to −2 because it corresponds to the dark cloud portion.

Thus, the image signal analyzing portion 2 defines and outputs the image luminance information Ymn with a differential value between the average luminance HYmn of an image corresponding to each region of the liquid crystal panel screen divided by the light source portion 7 and the average luminance HY a of the whole image.

There has been described the example in which the image luminance information Ymn is obtained as the average luminance value to determine the luminance of the back light. However, it is also possible to obtain image information from a luminance gray scale cumulative histogram of an image signal, an average value of each of the R, G and B signals of the image signals, a cumulative gray scale histogram, an average of a maximum value of any of the R, G and B signals or their combination, thereby determining a luminance or a light intensity of the back light. Moreover, although there has been described the example in which the luminance of each of the back lights is determined with only the image signal in the corresponding region to the back light, it is also possible to determine the luminance or the light intensity of the back light by using the image signal in a peripheral region.

The stereoscopic image signal I2 output from the image converting portion 1 is input to the liquid crystal panel portion 9. The liquid crystal panel portion 9 is constituted by a liquid crystal panel of a transmission type and a color filter is arranged on a panel surface, and scanning is sequentially carried out from the upper end side to the lower end side synchronously with the stereoscopic image signal I2 output from the image converting portion 1 to change a transmittance of light emitted from the back face every pixel depending on the gray scale of the stereoscopic image signal I2, thereby displaying an image. For this reason, a time that the change is started is varied in the upper and lower parts of the screen. Moreover, the liquid crystal gives a late response to a change in a transmittance and responds to gradually obtain an intended transmittance, and the transmittance is expressed as a gray scale.

Figure 6:
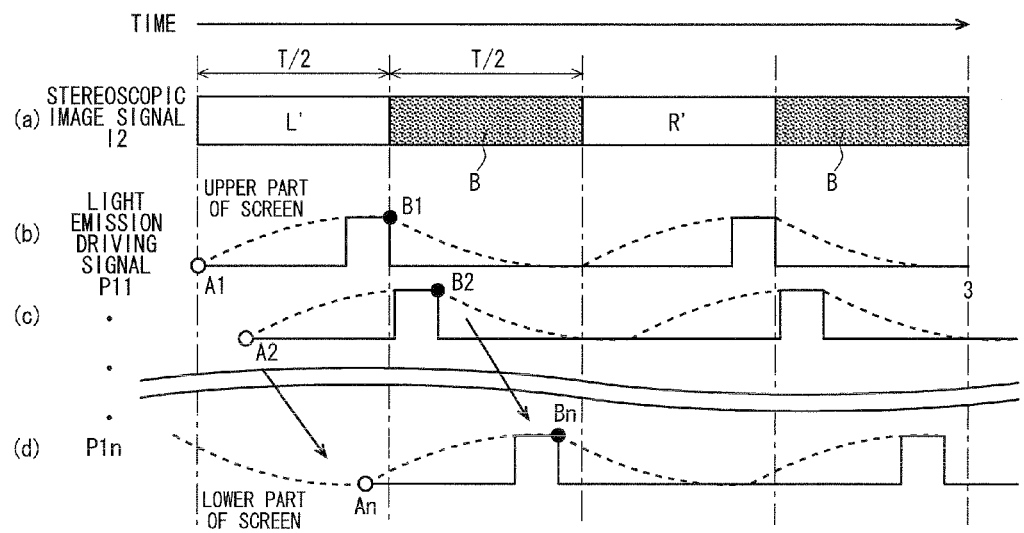
FIG. 6 is a timing chart showing a response characteristic of a liquid crystal and a light emission driving signal.

FIG. 6 is a timing chart showing a response characteristic of the liquid crystal in the liquid crystal panel portion 9 and the light emission driving signal Pmn of the back light. Herein, the light emission driving signal Pmn of the back light is represented by a binary signal, a Low level represents back light OFF and a High level represents back light ON. For convenience, description will be given on the assumption that the liquid crystal panel screen is not divided in the horizontal direction (m=1) but is divided into n parts in the vertical direction.

In FIG. 6, an axis of abscissa indicates a time base. As shown in part (a) of FIG. 6, in the stereoscopic image signal I2, a single black image B is inserted between a left eye image L' and a right eye image R' and a single image frame time of the left eye image L' or the right eye image R' becomes T/2.

For convenience, it is assumed that both the left eye image L' and the right eye image R' are white images.

In parts (b) to (d) of FIG. 6, the response characteristic of the liquid crystal is superimposed on the timing chart for the light emission driving signal Pmn of the back light in a broken line with a transmittance indicated as an axis of ordinate (not shown), and the liquid crystal has such a characteristic that the white image is given to start a rise in the transmittance, the transmittance is maximized immediately before the black image is given, the black image is given to start a fall in the transmittance and the transmittance is minimized before the white image is given again.

In other words, part (b) of FIG. 6 is a timing chart showing the light emission driving signal P11 in a region in an uppermost part of the liquid crystal panel screen (a region in an upper part in n portions obtained by a division in the vertical direction), and a writing operation is started in a gray scale of the left eye image L' at a point A1. The liquid crystal starts a response through the write of white data so that the transmittance is gradually increased. Then, an operation for writing the black image to be a next frame is started at a point B1. Therefore, the transmittance of the liquid crystal is started to be decreased. The liquid crystal writes black data so that the transmittance is gradually decreased. Consequently, it is apparent that a response time of the liquid crystal sufficiently passes and an intended transmittance corresponding to the left eye image L' is approached at a point immediately before the point B1. Accordingly, it is apparent that the light emission of the back light with the point B1 set as a reference for the fall to finish the light emission of the back light immediately before the point B1 at which the transmittance of the liquid crystal is maximized is an optimum control for effectively utilizing the light of the back light. For this reason, the light emission driving signal P11 is sent to bring the Low state at the point B1.

Referring to the response characteristic of the liquid crystal shown in the part (b) of FIG. 6, the response speed of the liquid crystal is low as an example. In the case in which the response speed of the liquid crystal is sufficiently high, a rise is carried out more sharply to reach the intended transmittance more rapidly so as to be constant. For this reason, timing for causing the back light to emit light may be set into this side much earlier.

Part (c) of FIG. 6 is a timing chart showing the light emission driving signal P12 in a next region to the uppermost part of the liquid crystal panel screen (a next region to the uppermost part in the n parts obtained by a division in the vertical direction). In the drawing, a writing operation is started in the gray scale of the left eye image L' in the region at a point A2, and an operation for writing the black image in the region is started at a point B2.

Moreover, part (d) of FIG. 6 is a timing chart showing the light emission driving signal P1n in a region of the lowermost part of the liquid crystal panel screen (a region of the lowermost part in the n parts obtained by the division in the vertical direction). In the drawing, a writing operation is started in the gray scale of the left eye image L' in the region at a point An, and an operation for writing the black image is started at a point Bn.

The point An is shifted rightward from the point A1 after a time passes. Thus, it is apparent that a point immediately before the point Bn is close to the intended transmittance corresponding to the left eye image L' also in the region of the lowermost part.

Consequently, the light emission of the back light with B1, B2, . . . Bn set to be a reference for a fall so as to be ended immediately before these points is an optimum control for effectively utilizing the light of the back light.

In other words, it is desirable to carry out a control for sequentially shifting the back light to emit light depending on the number n of the vertical divisions in order to finish the light emission immediately before a change in a next frame synchronously with a scan timing of an image. A shift quantity (a time shift quantity) with the passage of the time is determined by a cycle of the image synchronization signal V and the number n of the vertical divisions of the back light.

<Variation in Light Emission Driving Signal>

Next, timing for giving the light emission driving signal of the back light will further be described with reference to FIG. 7. For convenience, explanation will be given on the assumption that the liquid crystal panel screen is not divided in the horizontal direction (m=1) but is divided into four parts in the vertical direction.

Figure 7:
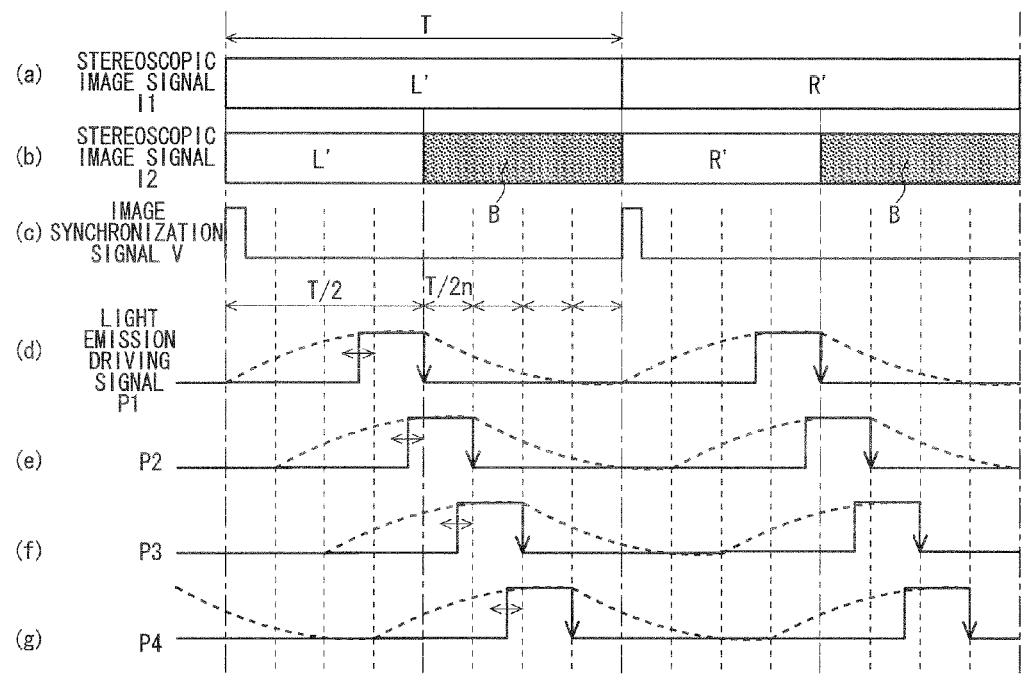
FIG. 7 is a timing chart showing the response characteristic of the liquid crystal and the light emission driving signal.

In FIG. 7, part (a) shows the stereoscopic image signal I1, part (b) shows the stereoscopic image signal I2 output from the image converting portion 1 and part (c) shows a timing chart for the image synchronization signal V.

The image synchronization signal V indicates pieces of head timing of the left eye image L' and the right eye image R' which are synchronized with the stereoscopic image signal I2 and is sent in a cycle T.

Part (d), part (e), part (f) and part (g) of FIG. 7 show, in a broken line, the response characteristic of the liquid crystal superimposed on timing charts for the light emission driving signals P1, P2, P3 and P4 of the back light with the transmittance set into an axis of ordinate (not shown).

Herein, the light emission driving signals P1 to P4 of the back light are represented by binary signals, a Low level represents back light OFF and a High level represents back light ON.

As described above, the reference of the fall of the light emission driving signal Pn is set to be the point Bn so that the optimum control for effectively utilizing the light of the back light is carried out.

As described above, it is desirable to carry out the control for sequentially shifting the back light to emit light depending on the number n of the vertical divisions in order to finish the light emission immediately before the change in the next frame synchronously with the scan timing of the image. A time shift quantity S is determined by the cycle T of the image synchronization signal V and the number n of the vertical divisions of the liquid crystal panel screen, and can be expressed in the following Equation (3).

[Equation 3]

$$S = T/2n \quad (3)$$

As shown in the part (d) of FIG. 7, a first fall in the light emission driving signal P1 is generated after a T/2 period since a rise in the image synchronization signal V, and subsequently, a time shift is carried out every shift quantity S to generate the light emission driving signal. In other words, in the case in which the liquid crystal panel screen is divided into four parts in the vertical direction, a falling point of the light emission driving signal P1 is equivalent to a point obtained after the passage of first T/2, a falling point of P2 is equivalent to a point obtained after the passage of T/2+T/8 and the time shift quantity S is equal to T/8.

The horizontal direction of the liquid crystal panel is rewritten every line. For this reason, in the case in which the liquid crystal panel screen is divided also in the horizontal direction, a scanning rewrite timing becomes identical in a region on the same horizontal line. In this case, the fall timing of the light emission driving signal is set to be identical in the region on the same horizontal line. In the case in which there is no division (n=1) in the vertical direction of the liquid crystal panel, it is assumed that there is no time shift quantity.

Herein, the High period of the light emission driving signal Pmn serves as the light emission period of the back light. Therefore, when the luminance is to be increased, the fall timing is not changed but the rise timing is varied to prolong the High period. Thus, when the luminance is to be regulated, the fall timing of the light emission driving signal Pmn is fixed and the rise timing is adjusted to regulate the luminance. The part (d) to the part (g) of FIG. 7 show, in an arrow, an example of a range of the change in the rise timing for regulating the luminance before and after the rise timing.

In the stereoscopic image signal I2, the black image B corresponding to a single screen is inserted between the left eye image L' and the right eye image R'. The black image B does not need to be displayed, and the back light is turned OFF for a period of the black image B in order to prevent a 3D crosstalk in a transient state during a response. In other words, it is desirable to carry out such a control as to emit light at 50% of the cycle T or less. Furthermore, the 3D crosstalk is suppressed more greatly if the light emission period is shorter.

Moreover, in the case in which the number of the divisions in the vertical direction of the liquid crystal panel screen is small, a width in the vertical direction is increased. For this reason, a difference between pieces of scan timing of the liquid crystal is increased in the upper and lower parts of the divided region.

For example, in the case in which the number of the divisions in the vertical direction is four, a quarter width of the full vertical scanning period is possessed. In such a case, it is also possible to uniformly shift a phase of the light emission driving signal backward by calculating an image scanning start time in a central part in the vertical direction of the region divided in the vertical direction to start a scan in this position.

More specifically, in FIG. 7, the light emission driving signal P1 sets the region in the uppermost part of the liquid crystal panel screen (the region in the uppermost part obtained by the division into four parts in the vertical direction). However, in the example shown in FIG. 8, the light emission driving signal P1 is generated to further divide, into two equal parts, the region of the uppermost part obtained by the four-division of the full vertical scanning period, thereby setting a region on a lower side into a scanning start point.

Figure 8:
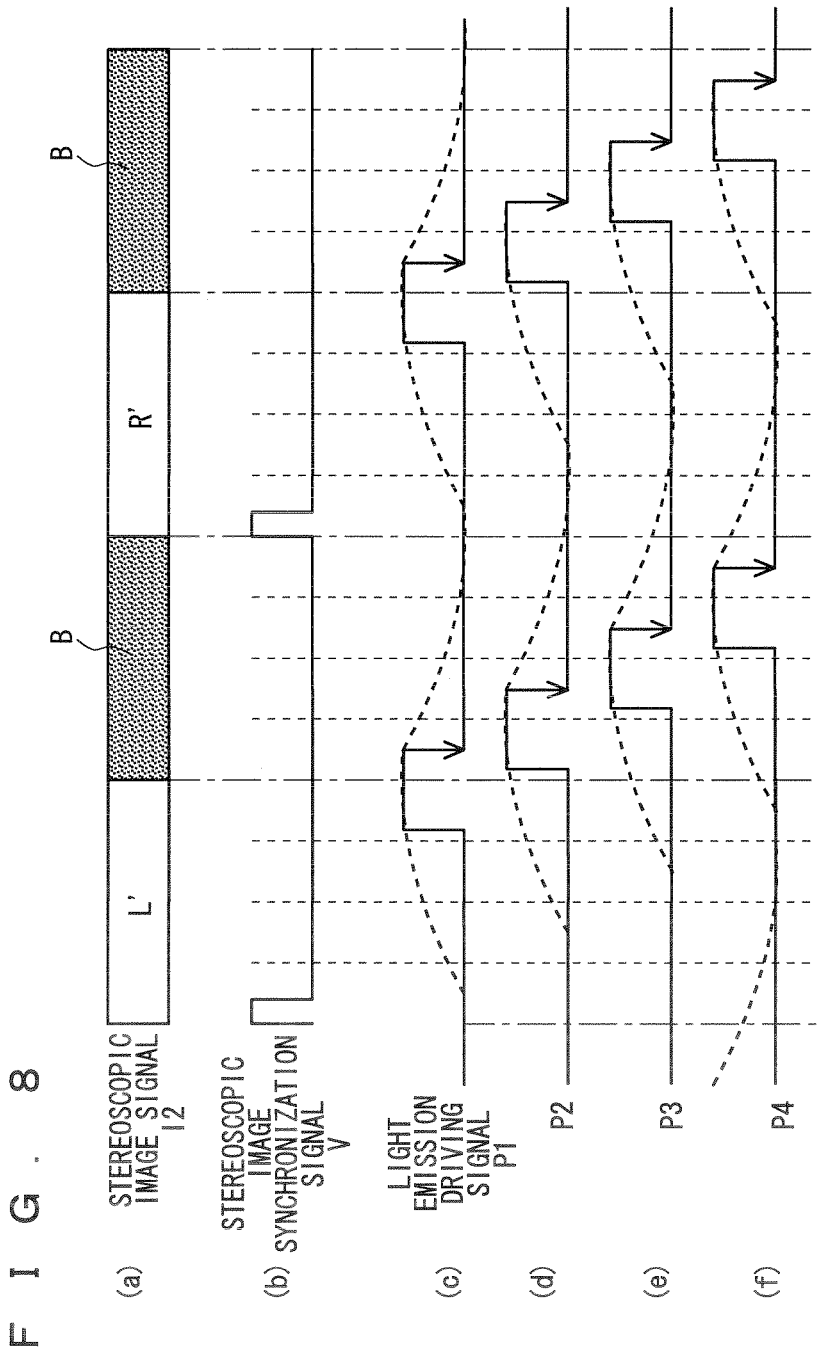
FIG. 8 is a timing chart showing another example of the response characteristic of the liquid crystal and the light emission driving signal.

As shown in part (d), part (e), part (f) and part (g) of FIG. 8, the response characteristic of the liquid crystal is superimposed on timing charts for the light emission driving signals P1, P2, P3 and P4 of the back light in a broken line with the transmittance set into an axis of ordinate (not shown). The pieces of timing for the light emission driving signals P1, P2, P3 and P4 are uniformly shifted every T/4n backward from the timing charts shown in the part (d), part (e), part (f) and part (g) of FIG. 7.

In the example of FIG. 7, the point where the operation for writing the black image B is started is set to be the reference for the fall of the light emission driving signal P1. However, in FIG. 8, the light emission driving signals P1 to P4 are set to include a peak of the response of the liquid crystal in the light emission period by causing a slightly rear point from the point where the operation for writing the black image B is started to be the reference for the fall of the light emission driving signal P1. Thus, it is desirable that the timing for the light emission driving signal Pmn should be constituted to enable optional regulation.

Thus, by sequentially turning ON the back light synchronously with the scan of an image, it is possible to optimally set the light emission timing for the back light corresponding to the response speed of the liquid crystal at the upper and lower sides of the liquid crystal panel. Consequently, it is possible to produce the effect for suppressing the 3D crosstalk.

Next, description will be given to an operation for creating the light emission driving signal Pmn based on the image luminance information Ymn output from the image signal analyzing portion 2.

The light emission period of the light emission driving signal Pmn, that is, the period of High defines the luminance. In the case in which the luminance is varied, the rise timing is changed based on the fall of the light emission driving signal.

The horizontal direction of the liquid crystal panel is rewritten every line. For this reason, in the case in which the liquid crystal panel screen is divided also in the horizontal direction, a scanning rewrite timing becomes identical in a region on the same horizontal line. In this case, the fall timing of the light emission driving signal is set to be identical in the region on the same horizontal line.

As described above, the image luminance information Ymn is output, from the image signal analyzing portion 2, as a differential value between the average luminance HYmn of an image corresponding to each region of the liquid crystal panel screen which is obtained by the division through the light source portion 7 and the average luminance HYa of the whole image. Therefore, the light emission period of the light source corresponding to the region obtained by dividing the liquid crystal panel screen is increased/decreased from the reference light emission period through the image luminance information Ymn based on the light emission period to be the luminance set value of the whole screen which is determined by a user. In this case, the black image is inserted into the stereoscopic image signal I2 as described above. Therefore, light is emitted with a maximum light emission period of 50% or less.

The operation will be specifically described with reference FIG. 9. For instance, in the example of the image described with reference to FIG. 5, the case in which the light emission period of the light emission driving signal in the cycle T is 30% is set to be a reference for the luminance set value of the whole screen. In this case, the luminance level of +2 indicates the case in which the light emission period in the cycle T is 50%, the luminance level of +1 indicates the case in which the light emission period in the cycle T is 40%, the luminance level of 0 indicates the case in which the light emission period in the cycle T is 30%, the luminance level of −1 indicates the case in which the light emission period in the cycle T is 20%, and the luminance level of −2 indicates the case in which the light emission period in the cycle T is 10%.

Figure 9:
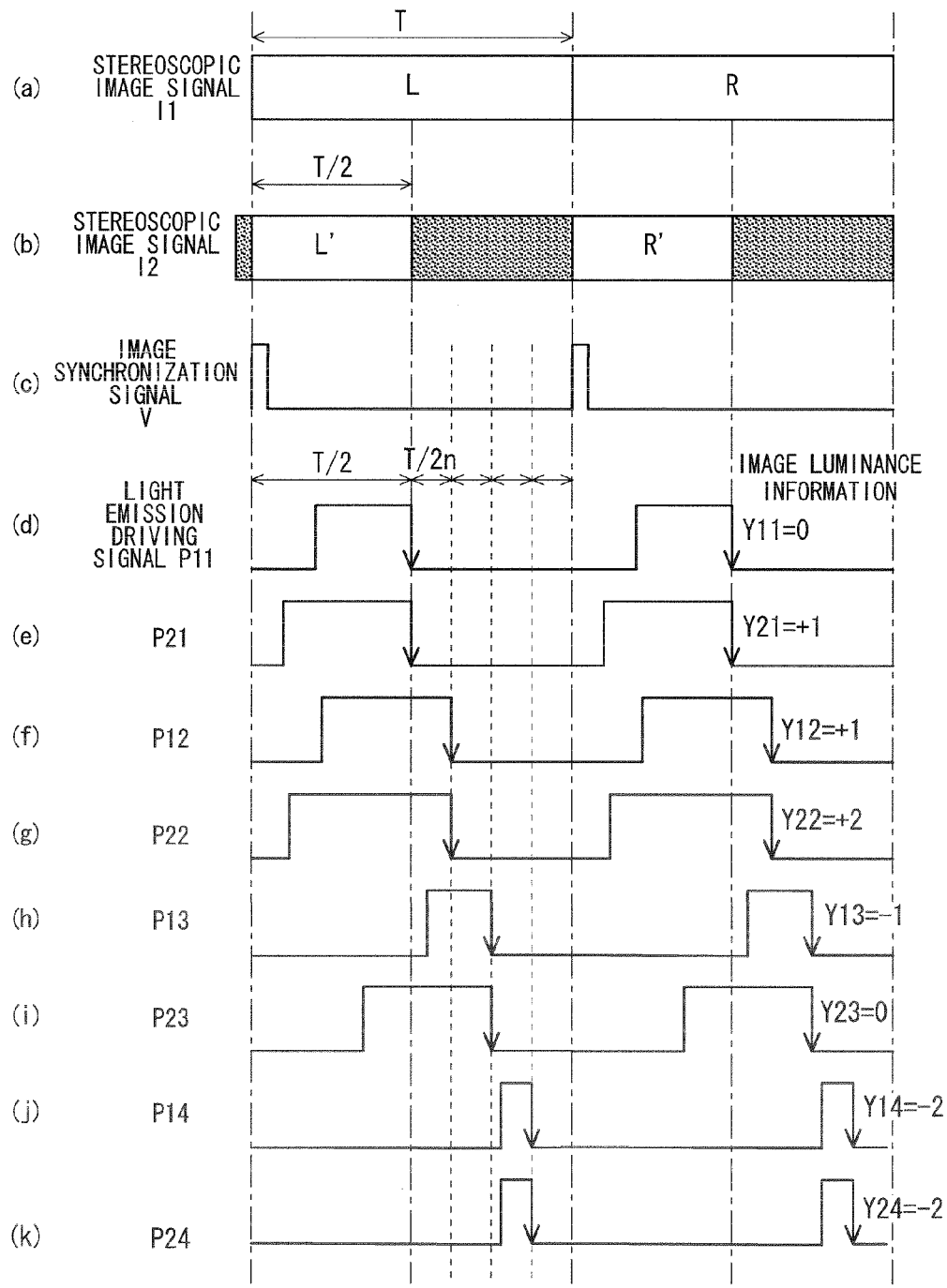
FIG. 9 is a timing chart showing a light emission driving signal to which image luminance information is applied.

FIG. 9 shows a light emission period which is synchronous with the scan of an image in the example of the image in FIG. 5. In FIG. 9, part (a) shows the stereoscopic image signal I1, part (b) shows the stereoscopic image signal I2 output from the image converting portion 1 and part (c) shows a timing chart for the image synchronization signal V.

The image synchronization signal V indicates pieces of head timing of the left eye image L' and the right eye image R' which are synchronized with the stereoscopic image signal I2 and is sent in a cycle T.

Part (d), part (e), part (f), part (g), part (h), part (i), part (j) and part (k) of FIG. 9 are timing charts for the light emission driving signals P11, P21, P12, P22, P13, P23, P14 and P24 of the back lights, respectively.

The light emission periods in the light emission driving signals P11 to P24 are defined by the image luminance information Y11 to Y24, respectively. In other words, the light emission period in the light emission driving signal P11 shown in the part (d) of FIG. 9 is defined by the image luminance information Y11, and the image luminance information Y11 has the luminance level of zero. Therefore, 30% of the cycle T has the High level.

The region of the liquid crystal panel screen divided by the back light to which the light emission driving signal P21 shown in the part (e) of FIG. 9 is given is placed in the same position in the vertical direction as the region of the liquid crystal panel screen divided by the back light to which the light emission driving signal P11 is given. Therefore, the fall of the light emission driving signal is set into the same timing as the light emission driving signal P11. This is also the same in a relationship between the light emission driving signals P12 and P22, a relationship between the light emission driving signals P13 and P23, and a relationship between the light emission driving signals P14 and P24.

The light emission period in the light emission driving signal P21 shown in the part (e) of FIG. 9 is defined by the image luminance information Y21, and the image luminance information Y21 has the luminance level of +1. Therefore, 40% of the cycle T has the High level.

In the case in which the luminance set value of the whole screen determined by the user is a maximum value, only a process for decreasing the light emission period is carried out in place of a process for increasing the light emission period based on the image luminance information Ymn.

To the contrary, in the case in which the luminance set value of the whole screen determined by the user is a minimum value, only the process for increasing the light emission period is carried out in place of the process for decreasing the light emission period based on the image luminance information Ymn.

Moreover, in the case in which the luminance set value of the whole screen determined by the user is close to the maximum value or the minimum value and exceeds the maximum value or the minimum value when the light emission period is increased/decreased based on the image luminance information Ymn, it is preferable to vary the extent of increase/decrease in order to include the luminance set value within a range between the maximum value and the minimum value.

As described above, it is possible to optimally set the light emission timing for the back light corresponding to the response speed of the liquid crystal by changing the rise timing in adaptation to the image luminance information based on the fall of the light emission driving signal. Therefore, it is possible to obtain the effect for suppressing the 3D crosstalk. Moreover, the luminance of the back light is varied depending on the luminance in the region obtained by the division of the liquid crystal panel. Therefore, it is possible to obtain an effect for enhancing the contrast of the display image.

<Light Detection>

In a light emitting device such as a laser diode or an LED, a light emitting intensity is changed due to a variation in a temperature of the device or aged deterioration in some cases. Moreover, the light emitting device itself has an individual difference in a quantity of light emission. For this reason, a color balance of the light source is changed so that unintended coloring or color shading occurs in an image to be displayed in some cases. In order to adjust the light source, there is employed a structure in which a light sensor is provided to set timing for carrying out light detection with the light detection gate signal GE.

It is desirable that the light detection should be carried out in timing for turning ON the back lights at the same time. In other words, in the case in which the light detection is simply carried out with the light detection gate signal GE in the same timing as the light emission period and the case in which the liquid crystal panel screen is divided in the vertical direction to perform a control for time shifting the pieces of light emission timing of the back lights, there is no timing for turning ON the back lights at the same time.

Moreover, if a control for varying the luminances of the respective back lights is carried out with the stereoscopic image signal I2, a quantity of the light detection is influenced by the back light around a light sensor which is disposed and is not constant because light is diffused by means of the light guide plate.

In the example of the timing chart shown in FIG. 9, it is apparent that the light emission period for each of the light emission driving signals has a variation depending on an image to be input and there is no light emission in the same timing, and a change is made depending on the image. Therefore, a control for turning ON all of the back lights at the same time is carried out in timing on a boundary between the left eye image L and the right eye image R.

Figure 10:
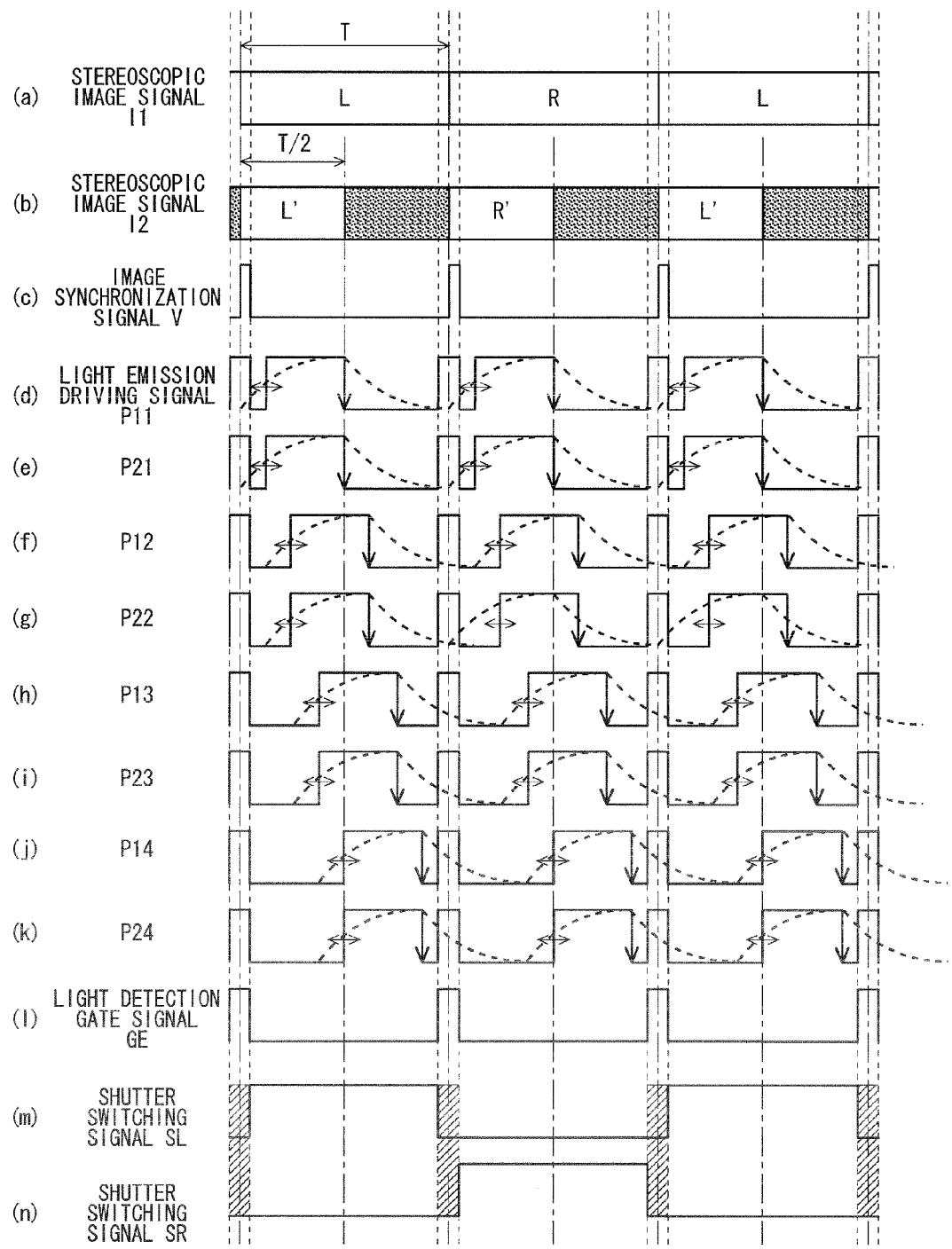
FIG. 10 is a timing chart showing a light emission driving signal including a light detection timing.

FIG. 10 illustrates a timing chart for the light emission driving signal Pmn and a timing chart for the light detection gate signal GE in the case in which the back lights are controlled to be turned ON at the same time. In FIG. 10, part (a) shows the stereoscopic image signal I1, part (b) shows the stereoscopic image signal I2 output from the image converting portion 1, and part (c) shows a timing chart for the image synchronization signal V.

The image synchronization signal V indicates the pieces of the head timing of the left eye image L' and the right eye image R' which are synchronous with the stereoscopic image signal I2 and is given in the cycle T.

Part (d), part (e), part (f), part (g), part (h), part (i), part (j) and part (k) of FIG. 10 show timing charts for the light emission driving signals P11, P21, P12, P22, P13, P23, P14 and P24 of the back lights, respectively.

Moreover, part (l), part (m) and part (n) of FIG. 10 show a timing chart for the light detection gate signal GE and timing charts for the shutter switching signals SL and SR, respectively.

FIG. 10 is a timing chart showing a structure in which two by four back lights are disposed to divide the liquid crystal panel screen into two parts in the horizontal direction (X direction) and four parts in the vertical direction (Y direction) in the same manner as FIG. 5.

As shown in FIG. 10, the light emission driving signal Pmn includes a pulse for turning ON the back lights at the same time in the timing on the boundary between the left eye image L and the right eye image R. The timing for the boundary between the left eye image L and the right eye image R is determined by the image synchronization signal V. In other words, the pulse for turning ON the back lights at the same time is generated before or after timing for the rise in the image synchronization signal V.

The fall timing for the light emission driving signal Pmn is identical in a region of the liquid crystal panel divided by the back light and a region having the same position in the vertical direction, and the position in the vertical direction is changed so that the fall timing is varied.

Moreover, in FIG. 10, moreover, any light emission period is equal. An example of a range of the variation in the rise timing for regulating a luminance is shown in an arrow before and after the rise timing in the part (d) to the part (k) of FIG. 10.

Thus, the light emission driving signals P11 to P24 are constituted in such a manner that the pulse for turning ON the back lights at the same time is given in the timing on the boundary between the left eye image L and the right eye image R in the stereoscopic image signal I1. Then, the light detection gate signal GE is generated in the same timing as the pulse for turning ON the back lights at the same time.

It is desirable that the light emission period obtained by the pulse for turning ON the back lights at the same time should be determined by the sensitivity and light quantity of the light sensor in the light detecting portion 5 and should be as short as possible. Moreover, when the light emission period is prolonged, there is a possibility that the light emission period might overlap with a period for changing the light emission period based on the image luminance information described above. At this time, it is preferable to permit the period even if the overlap is caused or to limit a maximum light emission period in the period for changing the light emission period based on the image luminance information in consideration of the period for turning ON the back lights at the same time.

By controlling to turn ON the back lights at the same time, thus, it is possible to carry out stable light detection. However, there is a possibility that an image in the middle of a response of the liquid crystal might be observed to cause a 3D crosstalk for the period in which the back lights are turned ON at the same time to carry out the light detection.

Therefore, for the period in which the back lights are turned ON at the same time, the shutter switching signals SL and SR for switching transmission and non-transmission of the left and right eyes of the shutter glass portion 10 are set into the Low level, thereby closing both of the right and left eyes. Consequently, it is possible to suppress the 3D crosstalk.

The shutter switching signals SL and SR are constituted by binary signals, and the shutter is opened so that an image is transmitted and seen for the period of High and the shutter is closed, and an image is non-transmitted for the period of Low.

Diagonal line regions in the part (m) and the part (n) of FIG. 10 represent periods in which both of the right and left eyes are closed.

It is supposed that a shutter for switching the shutter glass portions 10 into transmission or non-transmission has a slow response time in the case in which it is constituted by a liquid crystal, for example. In this case, it is preferable to regulate timing for the rise or fall of the shutter switching signal or the period of High into the timing for turning ON the back lights at the same time in such a manner that the shutter is completely set into the non-transmission in consideration of a response speed.

As described above, it is possible to carry out the stable light detection by constituting the light emission driving signal Pmn to turn ON the back lights at the same time and generating the pulse of the light detection gate signal GE in the timing for the turning ON the back lights at the same time. Moreover, it is also possible to suppress the influence of the 3D crosstalk due to the light emission of the back lights at the same time by setting the shutter into the non-transmission in the timing for emitting light at the same time in order to carry out the light detection in response to the shutter switching signals SL and SR of the shutter glass portion 10.

Thus, by using the stereoscopic image display device 100 according to the present invention, it is possible to obtain effects that the 3D crosstalk can be suppressed, a contrast of a display image can be enhanced, the stable light detection can be carried out, and a brightness or a color of the back light can be prevented from being changed due to a variation in a temperature of the back light or an elapsed time.

Furthermore, the light detection is carried out in the case in which the back lights are turned ON at the same time. Even the light detecting portion 4 is disposed in any place between the light guiding portion 8 and the liquid crystal panel portion 9, therefore, the same light detection value can be detected.

Consequently, it is possible to obtain an effect that the degree of freedom of disposition can be increased.

<Variant>

In the above description, the light emission driving signal for turning ON the back lights at the same time, and the light detection gate signal and shutter switching signal corresponding thereto are generated every frame to carry out the light detection, and the control is performed equally to the intended reference light detection value. However, if the change in the light source is not made every frame, it is also possible to turn ON the back lights at the same time, thereby carrying out the light detection once in a several frames, every several seconds or every several minutes to control the light source.

By carrying out the control at an interval in place of each frame, thus, it is possible to perform the light detection, thereby relieving a process for feedback controlling the light source.

Also in the case in which the back lights are not turned ON at the same time every frame, the shutter switching signal may carry out the control for setting both the left and right eyes into the non-transmission every frame as usual.

Second Preferred Embodiment

In the first preferred embodiment described above, the time shift quantity of the light emission driving signal Pmn is determined based on the image synchronization signal V output from the image converting portion 1, and the image synchronization signal V is determined based on the vertical cycle of the stereoscopic image signal I2. In the present preferred embodiment, it is assumed that the image converting portion 1 also outputs the image effective signal DE together with the image synchronization signal V, and the timing generating portion 3 determines the time shift quantity of the light emission driving signal Pmn based on the image effective signal DE in place of the image synchronization signal V. A structure of the device other than the structure described above is the same as that of the stereoscopic image display device 100 shown in FIG. 1.

The image effective signal DE indicates a single frame period for an image, that is, a period in which an image signal is actually present (an image effective period). The liquid crystal panel synchronously scans an image signal for the period of High of the image effective signal, thereby carrying out the writing operation. The single frame period for the image is equal to a period obtained by adding the image effective period to a blanking period.

The blanking period indicates a period for which the image signal is not present, that is, a period for which the operation for writing an image is not carried out. For example, in the case of a standard high definition television signal, vertical 1080 lines indicate the image effective period and the total number of the lines for the vertical period is 1125. A difference therebetween, that is, 45 lines indicate the blanking period.

Next, the detailed operation of the stereoscopic image display device 100 according to the second preferred embodiment will be described with reference to FIG. 11.

In FIG. 11, part (a) shows the stereoscopic image signal I1, part (b) shows the stereoscopic image signal I2 output from the image converting portion 1, part (c) shows a timing chart for the image synchronization signal V and part (d) shows a timing chart for the image effective signal DE. For convenience, explanation will be given on the assumption that the liquid crystal panel screen is not divided in the horizontal direction (m=1) but is divided into four parts in the vertical direction.

The image synchronization signal V indicates pieces of head timing of the left eye image L' and the right eye image R' which are synchronized with the stereoscopic image signal I2 and is sent in a cycle T.

Moreover, in the image effective signal DE, a period of High indicates an image effective period and a period of Low indicates a blanking period.

Part (e), part (f), part (g) and part (h) of FIG. 11 show, in a broken line, the response characteristic of the liquid crystal superimposed on timing charts for the light emission driving signals P1, P2, P3 and P4 of the back light with the transmittance set into an axis of ordinate (not shown). Moreover, the light emission driving signals P1 to P4 have the Low level representing back light OFF and the High level representing back light ON, and include such a pulse as to turn ON the backlights at the same time in the timing on the boundary between the left eye image L and the right eye image R.

As described with reference to FIG. 6, the reference of the fall of the light emission driving signal Pn is set to be the point Bn so that the optimum control for effectively utilizing the light of the back light is carried out.

As described above, it is desirable to carry out the control for sequentially shifting the back light to emit light depending on the number n of the vertical divisions in order to finish the light emission immediately before the change in the next frame synchronously with the scan timing of the image. However, in the second preferred embodiment, a time shift quantity S is determined by a period for the image effective signal DE and the number n of the vertical divisions of the back light, and can be expressed in the following Equation (4).

[Equation 4]

$$S=DE/n \tag{4}$$

As shown in the part (e) of FIG. 11, pieces of head timing for the left eye image L' and the right eye image R' are known from the image synchronization signal V. Therefore, a time shift is carried out for each shift quantity S based on the rise in the image effective signal DE after a T/2 cycle since the rise in the image synchronization signal V.

At this time, the rise timing for the image effective signal DE immediately after the rise in the image synchronization signal V is not used but a single image effective period is skipped and a rise timing for a next image effective signal DE is thus used. Consequently, it is possible to ensure a period for regulating the light emission timing of the back light corresponding to the response speed of the liquid crystal. Thus, it is possible to optimally set the light emission timing for the back light.

Moreover, the High period of the light emission driving signal Pmn serves as the light emission period of the back light. When the luminance is to be increased, therefore, the fall timing is not changed but the rise timing is varied to prolong the High period. When the luminance is to be regulated, thus, the fall timing of the light emission driving signal Pmn is fixed and the rise timing is adjusted to regulate the luminance. The part (e) to the part (h) of FIG. 11 show, in an arrow, an example of a range of the change in the rise timing for regulating the luminance before and after the rise timing. Thus, it is possible to obtain an effect that a range for changing the rising position of the light emission driving signal can also be ensured when the luminance is to be regulated.

The horizontal direction of the liquid crystal panel is rewritten every line. For this reason, in the case in which the liquid crystal panel screen is divided also in the horizontal direction, a scanning rewrite timing becomes identical in a region on the same horizontal line. In this case, the fall timing of the light emission driving signal is set to be identical in the region on the same horizontal line.

In the stereoscopic image signal I2, the black image B corresponding to a single screen is inserted between the left eye image L' and the right eye image R'. The black image B does not need to be displayed, and the back light is turned OFF for a period of the black image B in order to prevent a 3D crosstalk in a transient state during a response. In other words, it is desirable to carry out such a control as to emit light at 50% of the cycle T or less. Furthermore, the 3D crosstalk is suppressed more greatly as the light emission period is shorter.

Moreover, in the case in which the number of the divisions in the vertical direction of the liquid crystal panel screen is small, a width in the vertical direction is increased. For this reason, a difference between pieces of scan timing of the liquid crystal is increased in the upper and lower parts of the divided region.

For example, in the case in which the number of the divisions in the vertical direction is four, a quarter width of the full vertical scanning period is possessed. In such a case, it is also possible to uniformly shift a phase of the light emission driving signal backward by calculating an image scanning start time in a central part in the vertical direction of the region divided in the vertical direction to start a scan in this position.

More specifically, as described with reference to FIG. 8, it is preferable that the light emission driving signal should be generated in such a manner that the region of the uppermost part in the case of the four-division of the full vertical scanning period is further divided into half parts and a region on a lower side is set to be a scanning start point. Thus, it is desirable that the timing for the light emission driving signal Pmn should be constituted to enable optional regulation.

As described above, the time shift quantity S of the light emission driving signal Pmn is determined based on the rise in the image effective signal DE. Consequently, it is possible to take synchronization with a writing scan of an image more strictly. Consequently, it is possible to optimally set the light emission timing for the back light corresponding to the response speed of the liquid crystal in both the upper and lower part of the liquid crystal. Thus, it is possible to obtain an effect for suppressing a 3D crosstalk.

Moreover, the light detection is carried out optimally in the timing for turning ON the back lights at the same time. For this reason, the light emission driving signal Pmn is constituted in such a manner that the pulse for turning ON the backlights at the same time is given in timing for the blanking period of the image effective signal DE on the boundary between the left eye image L and the right eye image R in the stereoscopic image signal I1.

The pulse for turning ON the back lights at the same time may be set into any place for the blanking period, and the light detection gate signal GE is generated in the same timing as the pulse for turning ON the back lights at the same time as shown in the part (i) of FIG. 11.

For the period in which the back lights are turned ON at the same time, moreover, the shutter switching signals SL and SR for switching transmission and non-transmission of the left and right eyes of the shutter glass portion 10 are set into the Low level, thereby closing both of the right and left eyes.

The shutter switching signals SL and SR are constituted by binary signals, and the shutter is opened so that an image is transmitted and seen for the period of High and the shutter is closed and an image is non-transmitted for the period of Low.

Diagonal line regions in the part (j) and the part (k) of FIG. 11 represent periods in which both of the right and left eyes are closed.

Thus, by using the stereoscopic image display device 100 according to the present invention, it is possible to control the pieces of light emission timing of the back lights more lightly. Therefore, it is possible to suppress the 3D crosstalk. Moreover, the luminance of the back light is varied depending on the luminance in the region obtained by dividing the liquid crystal panel screen. Therefore, it is possible to obtain an effect that the contrast of the display image can be enhanced. In addition, it is possible to carry out the stable light detection, and to obtain an effect that a brightness or a color of a back light source can be prevented from being changed even if a temperature or an elapsed time is varied.

Third Preferred Embodiment

In the first and second preferred embodiments, the description has been given on the assumption that the image converting portion 1 converts the input stereoscopic image signal I1 into a double frame frequency and the single black image is inserted between the left eye image and the right eye image to create the stereoscopic image signal I2. However, in the present preferred embodiment, the image converting portion 1 does not insert the black image but converts the stereoscopic image signal I1 into a double frame frequency to create the stereoscopic image signal I2 in such a manner that the same image is continuously displayed twice. A structure of the device other than the structure described above is the same as that of the stereoscopic image display device 100 shown in FIG. 1.

The detailed operation of the stereoscopic image display device 100 according to the third preferred embodiment will be described below with reference to FIG. 12.

In FIG. 12, part (a) shows the stereoscopic image signal I1, part (b) shows the stereoscopic image signal I2 output from the image converting portion 1, and part (c) shows a timing chart for the image synchronization signal V. For convenience, explanation will be given on the assumption that the liquid crystal panel screen is not divided in the horizontal direction (m=1) but is divided into four parts in the vertical direction.

The image synchronization signal V indicates pieces of head timing of the left eye image L' and the right eye image R' which are synchronized with the stereoscopic image signal I2 and is sent in a cycle T.

The image converting portion 1 converts the stereoscopic image signal I1 into a double frame frequency and executes a process in such a manner that the same image as an input image is continuously displayed twice, for example, L1', L1', R1', R1' . . . for a frame period T/2 of a single image as shown in the part (b) of FIG. 12.

Part (d), part (e), part (f) and part (g) of FIG. 12 show, in a broken line, the response characteristic of the liquid crystal superimposed on timing charts for the light emission driving signals P1, P2, P3 and P4 of the back light with the transmittance set into an axis of ordinate (not shown). Moreover, the light emission driving signals P1 to P4 have the Low level representing back light OFF and the High level representing back light ON, and include such a pulse as to turn ON the backlights at the same time in the timing on the boundary between the left eye image L and the right eye image R.

It is assumed that the stereoscopic image signal I2 to be input to the liquid crystal panel portion 8 sets the left eye image L as a white image and the right eye image R as a black image.

The liquid crystal has such a characteristic that the white image is given to start a rise in the transmittance, the transmittance is maximized immediately before the black image is given, the black image is given to start a fall in the transmittance and the transmittance is minimized before the white image is given again.

The part (d) of FIG. 12 shows a timing chart for the light emission driving signal P1 in a region in an uppermost part of the liquid crystal panel screen (a region in an upper part in four parts obtained by a division in the vertical direction), and a writing operation is started in a white gray scale of the left eye image L1' at a point C1.

Then, there is carried out an operation for writing the same left eye image L1' in the white gray scale after the T/2 period. However, since images are entirely identical, the response of the liquid crystal is not changed. An operation for writing a black image to be a next right eye image R1' in a black gray scale is started at a point D1.

From the part (d) of FIG. 12, it is apparent that a response time of the liquid crystal sufficiently passes and an intended transmittance corresponding to the left eye image L' is approached at a point immediately before the point D1. Accordingly, it is apparent that the light emission of the back light with the point D1 set as a reference for the fall to finish the light emission of the back light immediately before the point D1 at which the transmittance of the crystal is maximized is an optimum control for effectively utilizing a back light beam. For this reason, the light emission driving signal P1 is sent to bring the Low state at the point D1.

On the other hand, a point C4 illustrated in the part (g) of FIG. 12 shows a timing chart for the light emission driving signal P4 in a region of the lowermost part of the liquid crystal panel screen (a region of the lowermost part in the four parts obtained by the division in the vertical direction). A writing operation is started in the white gray scale of the left eye image L1' at the point C4. Moreover, an operation for writing a black image to be a next right eye image R1' in the black gray scale is started at the point D4.

The point C4 is shifted rightward from the point C1 after a time passes. It is apparent that a point immediately before the point D4 is close to the intended transmittance corresponding to the left eye image L' also in the region of the lowermost part.

Thus, the light emission of the back light with D1, D2, . . . Dn set to be a reference for a fall to be ended immediately before these points is an optimum control for effectively utilizing the back light beam.

As compared with the point Bn according to the first preferred embodiment described with reference FIG. 6, the position of the point Dn is different. The reason is that the time shift of the light emission driving signal is to be started from the boundary between the image signal L' and the image signal R' in the stereoscopic image signal I2.

A time shift quantity S according to the third preferred embodiment is determined by the cycle T of the image synchronization signal V and the number n of the vertical divisions of the liquid crystal panel screen, and can be expressed in the Equation (3) described above.

As shown in the part (d) of FIG. 12, a first rise in the light emission driving signal P1 is generated after a T period since a rise in the image synchronization signal V, and subsequently, a time shift is carried out every shift quantity S to generate the light emission driving signal. In other words, in the case in which the liquid crystal panel screen is divided into four parts in the vertical direction, a falling point of the light emission driving signal P1 is equivalent to a point obtained after the passage of first T, a falling point of P2 is equivalent to a point obtained after the passage of T+T/8 and the time shift quantity S is equal to T/8.

The horizontal direction of the liquid crystal panel is rewritten every line. For this reason, in the case in which the liquid crystal panel screen is divided also in the horizontal direction, a scanning rewrite timing becomes identical in a region on the same horizontal line. In this case, the fall timing of the light emission driving signal is set to be identical in the region on the same horizontal line.

Herein, the High period of the light emission driving signal Pmn serves as the light emission period of the back light. Therefore, when the luminance is to be increased, the fall timing is not changed but the rise timing is varied to prolong the High period. Thus, when the luminance is to be regulated, the fall timing of the light emission driving signal Pmn is fixed and the rise timing is adjusted to regulate the luminance. The part (d) to the part (g) of FIG. 12 show, in an arrow, an example of a range of the change in the rise timing for regulating the luminance before and after the rise timing.

Moreover, in the case in which the number of the divisions in the vertical direction of the liquid crystal panel screen, a width in the vertical direction is increased. For this reason, a difference between pieces of scan timing of the liquid crystal is increased in the upper and lower parts of the divided region.

For example, in the case in which the number of the divisions in the vertical direction is four, a quarter width of the full vertical scanning period is possessed. In such a case, it is also possible to uniformly shift a phase of the light emission driving signal backward by calculating an image scanning start time in a central part in the vertical direction of the region divided in the vertical direction to start a scan in this position.

More specifically, as described with reference to FIG. 8, it is preferable that the light emission driving signal should be generated in such a manner that the uppermost part in the case of the four-division of the full vertical scanning period is further divided into half parts and a region on a lower side is set to be a scanning start point. Thus, it is desirable that the timing for the light emission driving signal Pmn should be constituted to enable optional regulation.

Moreover, as described in the second preferred embodiment, the image effective signal DE may be used to determine the shift quantity S.

In the third preferred embodiment, the description has been given on the assumption that the black image is not inserted in the image converting portion and the image converting portion 1 converts the stereoscopic image signal I1 into a double frame frequency to create the stereoscopic image signal I2. For this reason, the timing for generating the pulse for turning ON the plurality of back lights at the same time is constituted to generate the pulse before and after the T/2 period from the image synchronization signal V differently from the first and second preferred embodiments.

Moreover, the light detection gate signal GE is generated in the same timing as the pulse for turning ON the back lights at the same time as shown in the part (i) of FIG. 12.

Moreover, for the period in which the back lights are turned ON at the same time, the shutter switching signals SL and SR for switching transmission and non-transmission of the left and right eyes of the shutter glass portion 10 are set into the Low level, thereby closing both of the right and left eyes.

The shutter switching signals SL and SR are constituted by binary signals, and the shutter is opened so that an image is transmitted and seen for the period of High and the shutter is closed and an image is non-transmitted for the period of Low.

Diagonal line regions in the part (j) and the part (k) of FIG. 12 represent periods for which both of the right and left eyes are closed.

In the third preferred embodiment, the description has been given on the assumption that the black image is not inserted in the image converting portion and the image converting portion 1 converts the input stereoscopic image signal I1 into a double frame frequency to create the stereoscopic image signal I2. Therefore, it is possible to ensure a time required for a sufficient response of the liquid crystal. Thus, it is possible to prevent a 3D crosstalk from being caused by a low response speed of the liquid crystal.

Moreover, the luminance of the back light is varied depending on the luminance in the region obtained by dividing the liquid crystal panel screen. Therefore, it is possible to obtain an effect that the contrast of the display image can be enhanced. In addition, it is possible to carry out the stable light detection, and to obtain an effect that a brightness or a color of a back light source can be prevented from being changed even if a temperature or an elapsed time is varied.

In the present invention, each of the preferred embodiments can freely be combined or can be properly changed or omitted without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A stereoscopic image display device comprising:
   a liquid crystal panel portion to be horizontally scanned sequentially from an upper part to a lower part of a liquid crystal panel screen based on a stereoscopic image signal, thereby varying a transmittance of light depending on a gray scale of said stereoscopic image signal;
   a light guiding portion provided on a back face side of said liquid crystal panel portion for receiving light from a light source portion and diffusing said light to form a uniform surface light source;
   a light detecting portion for detecting a light intensity of light emitted from said light guiding portion; and
   a light source controlling portion for controlling a light emission intensity value of said light source portion in such a manner that a light detection value of said light detecting portion is equal to a preset reference light detection value,
   wherein said light source portion includes a plurality of back lights provided corresponding to respective regions obtained by virtually dividing said liquid crystal panel screen into a plurality of parts,
   said plurality of back lights have a light emission intensity controlled based on said light emission intensity value and have ON and OFF operations controlled in response to a light emission driving signal,
   said light emission driving signal is constituted to sequentially turn ON said plurality of back lights synchronously with said stereoscopic image signal and to turn ON said plurality of back lights at the same time in a predetermined timing, and is constituted to individually control a light emission period for said plurality of back lights based on image information about said stereoscopic image signal, and
   said light detecting portion is controlled to carry out a detecting operation in such timing as to turn ON the back lights at the same time based on a light detection gate signal.

2. The stereoscopic image display device according to claim 1, wherein said image information about said stereoscopic image signal includes image luminance information acquired from luminance information, and
   said image luminance information is defined by a differential value between an average luminance corresponding to the respective regions obtained by virtually dividing said liquid crystal panel screen and an average luminance of a whole image displayed on said liquid crystal panel screen, the average luminances being acquired from said luminance information.

3. The stereoscopic image display device according to claim 2, further comprising a shutter glass portion which is used when visually recognizing an image displayed on said liquid crystal panel screen based on said stereoscopic image signal and alternately switches left and right eye shutters into transmission or non-transmission, thereby seeing said image as a stereoscopic image artificially,
   said shutter glass portion having said left and right eye shutters switched into transmission or non-transmission in response to a shutter switching signal, and
   said shutter switching signal being constituted to switch both of said left and right eye shutters into non-transmission in such timing as to turn ON said plurality of back lights at the same time.

4. The stereoscopic image display device according to claim 1, wherein said light emission driving signal has timing set based on an image synchronization signal which is synchronous with said stereoscopic image signal or an image effective signal.

5. The stereoscopic image display device according to claim 1, wherein said light detecting portion is provided in an optional position between said light guiding portion and said liquid crystal panel portion.

6. The stereoscopic image display device according to claim 1, wherein said stereoscopic image signal is constituted to receive a left eye image and a right eye image which are captured on two visual points in time sharing, to convert image signals arranged to make a pair into a double frame frequency and to insert a black image between said left eye image and said right eye image.

7. The stereoscopic image display device according to claim 1, wherein said stereoscopic image signal is constituted to receive a left eye image and a right eye image which are captured on two visual points in time sharing, to convert image signals arranged to make a pair into a double frame frequency and to continuously display the same image twice.

8. The stereoscopic image display device according to claim 3,
   wherein each of said light emission driving signal for turning ON said plurality of back lights at the same time, said light detection gate signal and said shutter switching signal is given every frame or at a predetermined interval,
   an operation for controlling said light emission intensity value is thus executed said every frame or at said predetermined interval in such a manner that said light detection value in said light detecting portion in said light source controlling portion is equal to said reference light detection value.

9. The stereoscopic image display device according to claim 1, wherein said light source controlling portion carries out a control for gradually decreasing said reference light detection value with a passage of a time.

10. The stereoscopic image display device according to claim 1, wherein said light source controlling portion records and holds a reference light emission intensity value serving as an initial value to be given to said light source portion every condition of a back light temperature and an elapsed time.

11. The stereoscopic image display device according to claim 1, wherein said light source controlling portion records and holds a final light emission intensity value at a time of an OFF operation of said light source portion and sets said value as an initial value to be given to said light source portion.

* * * * *